US011232341B2

(12) United States Patent
Lowe et al.

(10) Patent No.: US 11,232,341 B2
(45) Date of Patent: Jan. 25, 2022

(54) METAL, CERAMIC, OR CERAMIC-COATED TRANSACTION CARD WITH WINDOW OR WINDOW PATTERN AND OPTIONAL BACKLIGHTING

(71) Applicant: CompoSecure, LLC, Somerset, NJ (US)

(72) Inventors: Adam Lowe, Somerset, NJ (US); Luis Dasilva, Bridgewater, NJ (US)

(73) Assignee: COMPOSECURE, LLC, Somerset, NJ (US)

( * ) Notice: Subject to any disclaimer, the term of this patent is extended or adjusted under 35 U.S.C. 154(b) by 0 days.

(21) Appl. No.: 16/757,310

(22) PCT Filed: Sep. 26, 2018

(86) PCT No.: PCT/US2018/052832
§ 371 (c)(1),
(2) Date: Apr. 17, 2020

(87) PCT Pub. No.: WO2019/079007
PCT Pub. Date: Apr. 25, 2019

(65) Prior Publication Data
US 2021/0158124 A1    May 27, 2021

Related U.S. Application Data

(60) Provisional application No. 62/573,789, filed on Oct. 18, 2017, provisional application No. 62/610,745, (Continued)

(51) Int. Cl.
*G06K 19/077* (2006.01)
*B42D 25/22* (2014.01)
(Continued)

(52) U.S. Cl.
CPC .......... *G06K 19/07722* (2013.01); *B32B 3/30* (2013.01); *B32B 9/005* (2013.01); (Continued)

(58) Field of Classification Search
CPC .......... G06K 19/07722; G06K 19/077; B42D 25/22; B42D 25/328; B42D 25/346; (Continued)

(56) References Cited

U.S. PATENT DOCUMENTS 3,802,101 A    4/1974    Scantlin
4,737,620 A    4/1988    Mollet et al.
(Continued)

FOREIGN PATENT DOCUMENTS

CA    2347818 A1    5/2000
CA    2860909 A1    8/2013
(Continued)

OTHER PUBLICATIONS

Singapore Written Opinion for Application No. 11202003431Y, dated Apr. 22, 2021, 7 pages.
(Continued)

*Primary Examiner* — Justin V Lewis
(74) *Attorney, Agent, or Firm* — RatnerPrestia

(57) ABSTRACT

A transaction card includes at least one metal layer having one or more apertures therein. A light guide is disposed beneath the metal layer. The light guide has a light output and a light input. The light output is positioned to transmit light through at least the one or more apertures of the metal layer. At least one LED is positioned to transmit light into the light guide light input.

76 Claims, 10 Drawing Sheets

Related U.S. Application Data filed on Dec. 27, 2017, provisional application No. 62/686,358, filed on Jun. 18, 2018.

(51) Int. Cl.

| | |
|---|---|
| *B42D 25/328* | (2014.01) |
| *B42D 25/346* | (2014.01) |
| *B42D 25/351* | (2014.01) |
| *B42D 25/373* | (2014.01) |
| *B42D 25/455* | (2014.01) |
| *B42D 25/46* | (2014.01) |
| *B42D 25/475* | (2014.01) |
| *B32B 3/30* | (2006.01) |
| *B32B 9/00* | (2006.01) |
| *B32B 15/04* | (2006.01) |
| *B32B 37/18* | (2006.01) |
| *B32B 38/00* | (2006.01) |
| *F21V 23/06* | (2006.01) |
| *F21V 33/00* | (2006.01) |
| *F21Y 115/10* | (2016.01) |
| *F21V 8/00* | (2006.01) |
| *G06Q 20/34* | (2012.01) |

(52) U.S. Cl.
CPC .............. *B32B 15/04* (2013.01); *B32B 37/18* (2013.01); *B32B 38/0004* (2013.01); *B32B 38/145* (2013.01); *B42D 25/22* (2014.10); *B42D 25/328* (2014.10); *B42D 25/346* (2014.10); *B42D 25/351* (2014.10); *B42D 25/373* (2014.10); *B42D 25/455* (2014.10); *B42D 25/46* (2014.10); *B42D 25/475* (2014.10); *F21V 23/06* (2013.01); *F21V 33/0004* (2013.01); *B32B 2255/06* (2013.01); *B32B 2255/20* (2013.01); *B32B 2307/412* (2013.01); *B32B 2310/0843* (2013.01); *B32B 2425/00* (2013.01); *F21Y 2115/10* (2016.08); *G02B 6/0011* (2013.01); *G06Q 20/352* (2013.01)

(58) Field of Classification Search
CPC .. B42D 25/351; B42D 25/373; B42D 25/455; B42D 25/46; B42D 25/475; B32B 3/30
USPC ...... 283/67, 70, 72, 74, 82, 83, 94, 98, 100, 283/109, 110, 111, 904
See application file for complete search history.

(56) References Cited

U.S. PATENT DOCUMENTS

| | | | |
|---|---|---|---|
| 5,013,900 | A | 5/1991 | Hoppe |
| 5,350,553 | A | 9/1994 | Gläser et al. |
| 5,463,953 | A | 11/1995 | Kaspers et al. |
| 5,574,309 | A | 11/1996 | Papapietro et al. |
| 5,598,032 | A | 1/1997 | Fidalgo |
| 5,681,356 | A | 10/1997 | Barak et al. |
| 5,774,339 | A | 6/1998 | Ohbuchi et al. |
| 5,935,497 | A | 8/1999 | Rose |
| 6,065,681 | A | 5/2000 | Trueggelmann |
| 6,188,580 | B1 | 2/2001 | Huber et al. |
| 6,724,103 | B2 | 4/2004 | Parrault |
| 6,817,532 | B2 | 11/2004 | Finkelstein |
| D529,955 | S | 10/2006 | Allard et al. |
| 7,237,724 | B2 | 7/2007 | Singleton |
| 7,701,350 | B2 | 4/2010 | Sakama et al. |
| 7,762,470 | B2 | 7/2010 | Finn et al. |
| 7,823,777 | B2 | 11/2010 | Varga et al. |
| 7,936,273 | B2 | 5/2011 | Kobayashi et al. |
| 7,954,228 | B2 | 6/2011 | Kobayashi et al. |
| 8,128,000 | B2 | 3/2012 | Forster |
| 8,141,786 | B2 | 3/2012 | Bhandarkar et al. |
| 8,174,454 | B2 | 5/2012 | Mayer |
| 8,226,013 | B2 | 7/2012 | Phillips et al. |
| 8,248,240 | B2 | 8/2012 | Osaki et al. |
| 8,261,997 | B2 | 9/2012 | Gebhart |
| 8,448,872 | B2 | 5/2013 | Droz |
| 8,519,905 | B2 | 8/2013 | Tanaka et al. |
| 8,608,082 | B2 | 12/2013 | Le Garrec et al. |
| 8,622,311 | B2 | 1/2014 | Hamedani et al. |
| 8,698,633 | B2 | 4/2014 | Kobayashi et al. |
| 8,725,589 | B1 | 5/2014 | Skelding et al. |
| 8,786,510 | B2 | 7/2014 | Coleman et al. |
| 8,789,762 | B2 | 7/2014 | Finn et al. |
| 8,978,987 | B2 | 3/2015 | Scarlatella |
| 9,000,619 | B2 | 4/2015 | Kato et al. |
| 9,058,547 | B2 | 6/2015 | Oh et al. |
| 9,099,789 | B1 | 8/2015 | Modro |
| 9,251,458 | B2 | 2/2016 | Finn et al. |
| 9,320,186 | B2 | 4/2016 | Droz |
| 9,390,363 | B1 | 7/2016 | Herslow et al. |
| 9,390,364 | B2 | 7/2016 | Finn et al. |
| 9,390,366 | B1 | 7/2016 | Herslow et al. |
| 9,475,086 | B2 | 10/2016 | Finn et al. |
| 9,489,613 | B2 | 11/2016 | Finn et al. |
| 9,622,359 | B2 | 4/2017 | Finn et al. |
| 9,634,391 | B2 | 4/2017 | Finn et al. |
| 9,697,459 | B2 | 7/2017 | Finn et al. |
| 9,721,200 | B2 | 8/2017 | Herslow et al. |
| D797,188 | S | 9/2017 | Hendrick |
| 9,760,816 | B1 | 9/2017 | Williams et al. |
| 9,798,968 | B2 | 10/2017 | Finn et al. |
| 9,812,782 | B2 | 11/2017 | Finn et al. |
| 9,836,684 | B2 | 12/2017 | Finn et al. |
| 9,898,699 | B2 | 2/2018 | Herslow et al. |
| D812,137 | S | 3/2018 | Daniel et al. |
| 10,032,099 | B2 | 7/2018 | Mosteller |
| 10,089,570 | B2 | 10/2018 | Herslow et al. |
| 10,140,569 | B2 | 11/2018 | Kim et al. |
| 10,147,999 | B2 | 12/2018 | Wang et al. |
| 10,193,211 | B2 | 1/2019 | Finn et al. |
| 10,339,434 | B2 | 7/2019 | Cox |
| 10,445,627 | B1 | 10/2019 | Sexl et al. |
| 10,583,683 | B1 | 3/2020 | Ridenour et al. |
| 2002/0190132 | A1 | 12/2002 | Kayanakis |
| 2003/0038174 | A1 | 2/2003 | Jones |
| 2003/0102541 | A1 | 6/2003 | Gore et al. |
| 2005/0087609 | A1 | 4/2005 | Martin |
| 2006/0102729 | A1* | 5/2006 | Gandel ............... G06K 19/067 235/487 |
| 2006/0219776 | A1 | 10/2006 | Finn |
| 2006/0226240 | A1 | 10/2006 | Singleton |
| 2007/0034700 | A1 | 2/2007 | Poidomani et al. |
| 2007/0290048 | A1 | 12/2007 | Singleton et al. |
| 2008/0001759 | A1 | 1/2008 | Kobayashi et al. |
| 2011/0024036 | A1 | 2/2011 | Benato |
| 2011/0315779 | A1 | 12/2011 | Bidin et al. |
| 2012/0044693 | A1 | 2/2012 | Hatase et al. |
| 2012/0201994 | A1 | 8/2012 | Michalk |
| 2012/0206869 | A1 | 8/2012 | Droz |
| 2013/0062875 | A1 | 3/2013 | Le Loarer et al. |
| 2013/0102113 | A1 | 4/2013 | Yang |
| 2013/0228628 | A1 | 9/2013 | Bona et al. |
| 2013/0247432 | A1 | 9/2013 | Droz |
| 2013/0255078 | A1 | 10/2013 | Cox |
| 2013/0299593 | A1 | 11/2013 | Glidden, III |
| 2014/0158773 | A1 | 6/2014 | Blum |
| 2014/0279555 | A1 | 9/2014 | Guillaud |
| 2014/0283978 | A1 | 9/2014 | Droz |
| 2014/0361086 | A1 | 12/2014 | Finn et al. |
| 2015/0021403 | A1 | 1/2015 | Finn et al. |
| 2015/0097040 | A1 | 4/2015 | Rampetzreiter et al. |
| 2015/0129665 | A1 | 5/2015 | Finn et al. |
| 2015/0136858 | A1 | 5/2015 | Finn et al. |
| 2015/0180229 | A1 | 6/2015 | Herslow |
| 2015/0206047 | A1 | 7/2015 | Herslow et al. |
| 2015/0235063 | A1 | 8/2015 | Loussert |
| 2015/0235122 | A1 | 8/2015 | Finn et al. |
| 2015/0239202 | A1 | 8/2015 | Purdy et al. |
| 2015/0269474 | A1 | 9/2015 | Finn et al. |
| 2015/0269477 | A1 | 9/2015 | Finn et al. |

(56) References Cited

U.S. PATENT DOCUMENTS

| | | |
|---|---|---|
| 2015/0278675 A1 | 10/2015 | Finn et al. |
| 2015/0339564 A1 | 11/2015 | Herslow et al. |
| 2016/0110639 A1 | 4/2016 | Finn et al. |
| 2016/0203399 A1 | 7/2016 | Cox |
| 2016/0229081 A1 | 8/2016 | Williams et al. |
| 2016/0365644 A1 | 12/2016 | Finn et al. |
| 2017/0017871 A1 | 1/2017 | Finn et al. |
| 2017/0077589 A1 | 3/2017 | Finn et al. |
| 2017/0106572 A1 | 4/2017 | Cepress et al. |
| 2017/0243099 A1 | 8/2017 | Kluge |
| 2017/0243104 A1 | 8/2017 | Cox |
| 2017/0262749 A1 | 9/2017 | Cox |
| 2017/0308785 A1 | 10/2017 | Kim et al. |
| 2017/0316300 A1 | 11/2017 | Herslow et al. |
| 2017/0316303 A1 | 11/2017 | Pachler et al. |
| 2017/0323193 A1 | 11/2017 | Kitney et al. |
| 2018/0068212 A1 | 3/2018 | Williams et al. |
| 2018/0157954 A1 | 6/2018 | Herslow et al. |
| 2018/0204105 A1 | 7/2018 | Herslow et al. |
| 2018/0307962 A1 | 10/2018 | Lowe et al. |
| 2018/0339503 A1 | 11/2018 | Finn et al. |
| 2018/0341846 A1 | 11/2018 | Finn et al. |
| 2018/0341847 A1 | 11/2018 | Finn et al. |
| 2018/0349751 A1 | 12/2018 | Herslow et al. |
| 2019/0050706 A1 | 2/2019 | Lowe |
| 2019/0114526 A1 | 4/2019 | Finn et al. |
| 2019/0130242 A1 | 5/2019 | Fu |
| 2019/0156073 A1 | 5/2019 | Finn et al. |
| 2019/0156994 A1 | 5/2019 | Cox |
| 2019/0197381 A1 | 6/2019 | Cox |
| 2019/0204812 A1 | 7/2019 | Cox |
| 2019/0206161 A1 | 7/2019 | Cox |
| 2019/0236434 A1 | 8/2019 | Lowe |
| 2019/0279065 A1 | 9/2019 | Cox |
| 2019/0300695 A1 | 10/2019 | Cox |

FOREIGN PATENT DOCUMENTS

| | | |
|---|---|---|
| CN | 100397406 C | 6/2008 |
| CN | 103153640 A | 6/2013 |
| DE | 19703122 C1 | 5/1998 |
| DE | 19848193 C1 | 11/1999 |
| DE | 19934434 A1 | 2/2001 |
| DE | 10132893 A1 | 1/2003 |
| DE | 102007016777 A1 | 10/2008 |
| DE | 102008053582 B3 | 4/2010 |
| EP | 0277854 A1 | 8/1988 |
| EP | 0426406 A2 | 5/1991 |
| EP | 2133828 A2 | 12/2009 |
| EP | 2722193 A1 | 4/2014 |
| EP | 2765648 A1 | 8/2014 |
| EP | 3009964 A1 | 4/2016 |
| JP | 61222715 A | 10/1986 |
| JP | 63072596 A | 4/1988 |
| JP | 63185688 A | 8/1988 |
| JP | 63239097 A | 10/1988 |
| JP | 021397 A | 1/1990 |
| JP | 02055198 A | 2/1990 |
| JP | 03205197 A | 9/1991 |
| JP | 0564861 A | 3/1993 |
| JP | 07501758 A | 2/1995 |
| JP | 08276459 A | 10/1996 |
| JP | 09315053 A | 12/1997 |
| JP | 10291392 A | 11/1998 |
| JP | 1111056 A | 1/1999 |
| JP | 2003234615 A | 8/2003 |
| JP | 2004094561 A | 3/2004 |
| JP | 2007021830 A | 2/2007 |
| KR | 20010080890 A | 8/2001 |
| KR | 20140117614 A | 10/2014 |
| KR | 20170061572 A | 6/2017 |
| KR | 20170120524 A | 10/2017 |
| TW | 201723933 A | 7/2017 |
| WO | 9809252 A1 | 3/1998 |
| WO | 2008105582 A1 | 9/2008 |
| WO | 2013110625 A1 | 8/2013 |
| WO | 2015071017 A1 | 5/2015 |
| WO | 2015071086 A1 | 5/2015 |
| WO | 2015144261 A1 | 10/2015 |
| WO | 2016020067 A1 | 2/2016 |
| WO | 2016046184 A1 | 3/2016 |
| WO | 2016073473 A1 | 5/2016 |
| WO | 2017007468 A1 | 1/2017 |
| WO | 2017090891 A1 | 6/2017 |
| WO | 2017177906 A1 | 10/2017 |
| WO | 2018022755 A1 | 2/2018 |
| WO | 2018132404 A1 | 7/2018 |
| WO | 2018138432 A1 | 8/2018 |
| WO | 2018202774 A | 11/2018 |

OTHER PUBLICATIONS

International Search Report and Written Opinion for International Application No. PCT/US2020/034661, dated Sep. 1, 2020, 16 pages.
Chen et al., "A Metallic RFID Tag Design for Steel-Bar and Wire-Rod Management Application in the Steel Industry", Progress in Electromagnetics Research, PIER 91, 2009, pp. 195-212.
International Search Report and Written Opinion for International Application No. PCT/US2017/043954, dated Oct. 5, 2017, 6 pages.
International Preliminary Report on Patentability for International Application No. PCT/US2017/043954, dated Jan. 29, 2019, 6 pages.
International Search Report and Written Opinion for International Application No. PCT/US2019/014656, dated Apr. 1, 2019, 16 pages.
Final Office Action for U.S. Appl. No. 16/164,322, dated Apr. 11, 2019, 20 pages.
Non Final Office Action for U.S. Appl. No. 29/663,230, dated Jul. 25, 2019, 19 pages.
Non Final Office Action for U.S. Appl. No. 16/441,363, dated Aug. 8, 2019, 23 pages.
Third Party Submission Under 37 CFR 1.290 Concise Statement of Relevance, dated Oct. 15, 2019, 13 pages.
International Search Report and Written Opinion for International Application No. PCT/US2019/056704, dated Dec. 18, 2019, 11 pages.
Third Party Submission Under 37 CFR 1.290 filed in U.S. Appl. No. 15/928,813 Concise Description of Relevance dated Oct. 27, 2019, 13 pages.
Third Party Sumission Under 37 CFR 1.290 filed in U.S. Appl. No. 15/928,813 Concise Description of Relevance dated Nov. 1, 2019, 8 pages.
Extended European Search Report for European Application No. 17835207.6, dated Mar. 10, 2020, 12 pages.
International Preliminary Report on Patentability for International Application No. PCT/US2018/049899, dated Mar. 10, 2020, 8 pages.
Japanese Notice of Reasons for Rejection for Japanese Application No. 2019-504037, dated Mar. 10, 2020 with translation, 7 pages.
Non Final Office Action for U.S. Appl. No. 15/928,813, dated Apr. 15, 2020, 51 pages.
Korean Office Action for Korean Application No. 10-2019-7005614, dated Apr. 17, 2020 with translation, 14 pages.
Non Final Office Action for U.S. Appl. No. 16/124,711, dated May 1, 2020, 31 pages.
International Preliminary Report on Patentability for International Application No. PCT/US2018/052832, dated Apr. 21, 2020, 9 pages.
Non Final Office Action for U.S. Appl. No. 16/783,504, dated Oct. 15, 2020, 38 pages.
Japanese Decision of Final Rejection for Japanese Application No. 2019-504037, dated Oct. 6, 2020 with translation, 5 pages.
European Communication Pursuant to Article 94(3) for European Application No. 17835207.6, dated Oct. 23, 2020, 6 pages.
Non Final Office Action for U.S. Appl. No. 16/427,864, dated Nov. 4, 2020, 56 pages.
Notice of Allowance for U.S. Appl. No. 16/783,504, dated Nov. 13, 2020, 12 pages.

(56) References Cited

OTHER PUBLICATIONS

Non Final Office Action for U.S. Appl. No. 16/751,285, dated Jan. 25, 2021, 51 pages.
International Search Report and Written Opinion for International Application No. PCT/US2021/013796, dated May 11, 2021, 22 pages.
Notice of Termination of Pretrial Reexamination for Japanese Application No. 2019-504037, dated May 18, 2021 with translation, 2 pages.
Report of Pretrial Reexamination of Japanese Application No. 2019-504037, dated May 12, 2021 with translation, 5 pages.
Japanese Notice of Reasons for Rejection for Japanese Application No. 2020-522026, dated May 25, 2021 with translation, 8 pages.
Canadian Examination Report for Canadian Application No. 3,088,900, dated Apr. 8, 2021, 6 pages.
Non Final Office Action for U.S. Appl. No. 16/320,597, dated Apr. 13, 2021, 74 pages.
International Preliminary Report on Patentability for International Application No. PCT/US2019/056704, dated Apr. 14, 2021, 7 pages.
Australian Examination Report for Australian Application No. 2019213838, dated Jun. 29, 2021, 8 pages.
Japanese Notice of Reasons for Rejection for Japanese Application No. 2020-541522, dated May 31, 2021 with translation, 7 pages.
Chinese Office Action for Chinese Application No. 201780046491.5, dated Jul. 5, 2021 with translation, 16 pages.
Indian Examination Report for Indian Application No. 202017013311, dated Jul. 8, 2021 with translation, 6 pages.
Non Final Office Action for U.S. Appl. No. 17/101,092, dated Sep. 16, 2021, 54 pages.
Non Final Office Action for U.S. Appl. No. 17/128,427, dated Jun. 29, 2021, 53 pages.
Taiwan Office Action for Taiwan Application No. 110102065, dated Dec. 1, 2021 with Search Report.
Final Office Action for U.S. Appl. No. 17/128,427, dated Oct. 5, 2021, 16 pages.
Taiwan Office Action for Taiwan Application No. 109117975, dated Sep. 24, 2021 with translation, 22 pages.
Non Final Office Action for U.S. Appl. No. 17/101,096, dated Oct. 15, 2021, 59 pages.

* cited by examiner

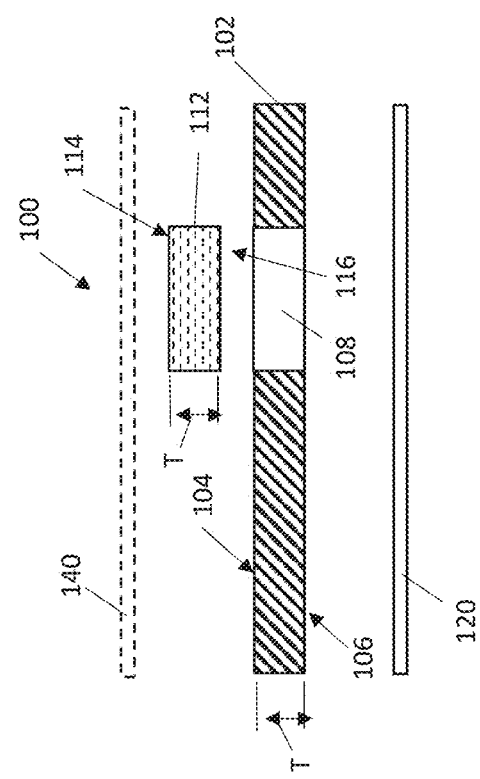
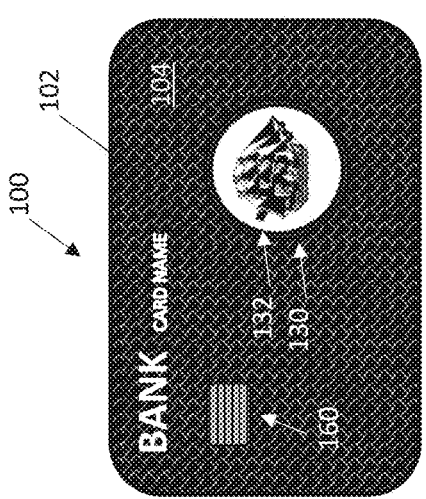
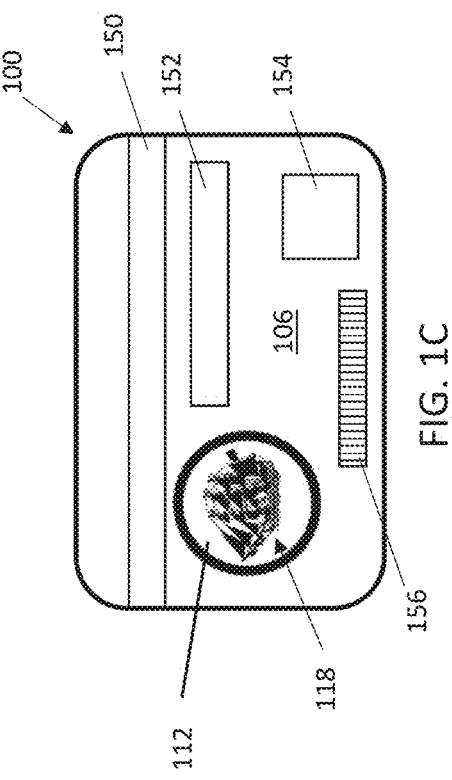
FIG. 1B
FIG. 1A
FIG. 1C

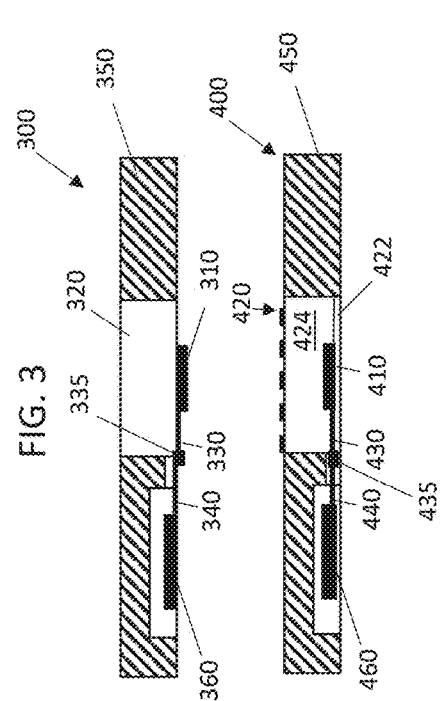
FIG. 3
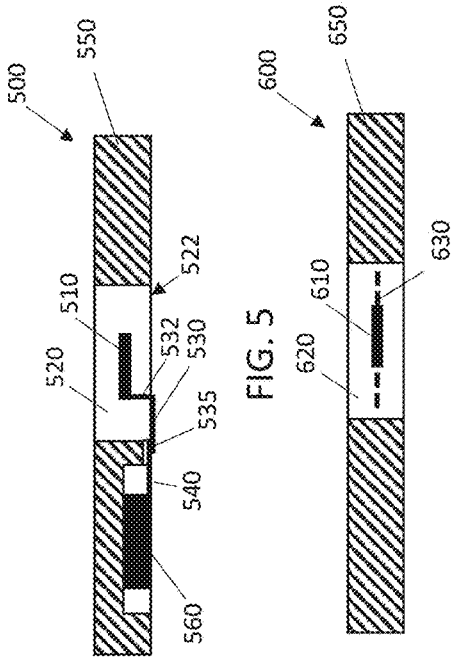
FIG. 4
FIG. 5
FIG. 6
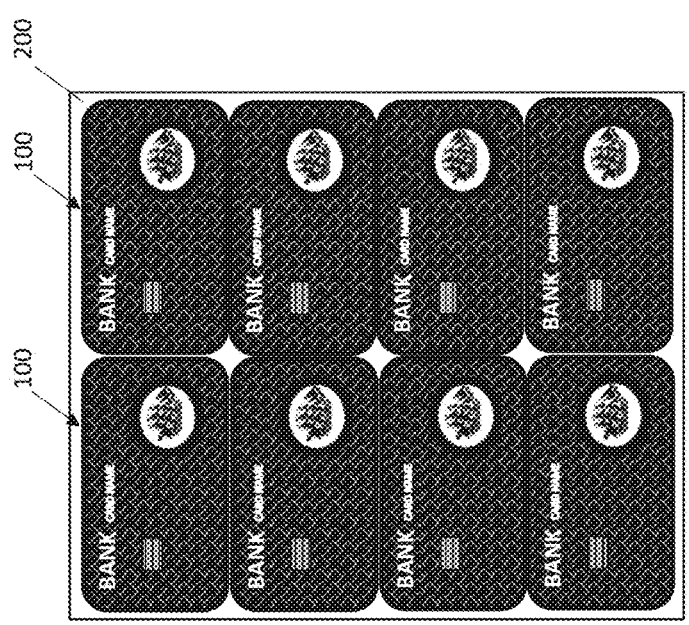
FIG. 2

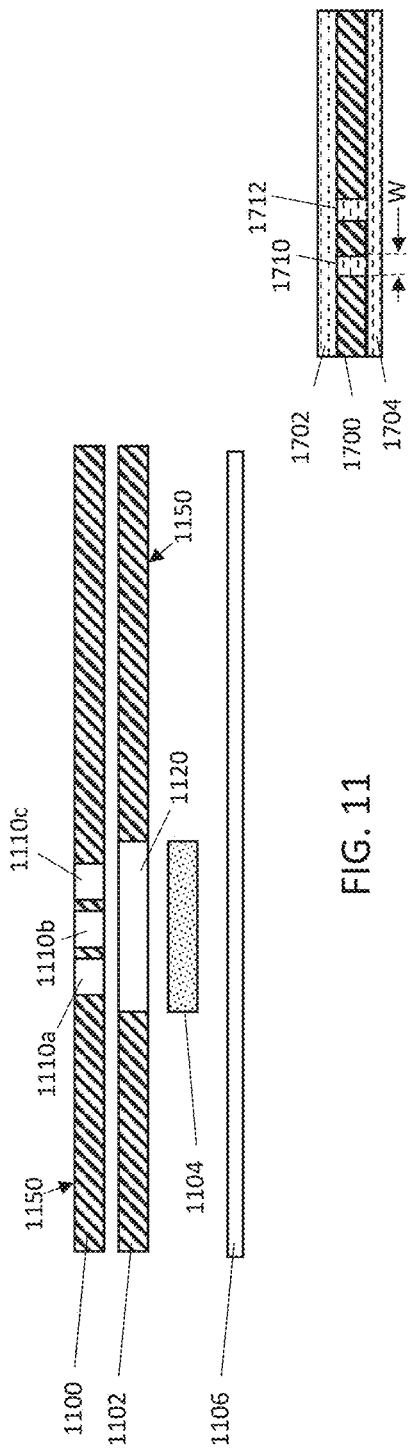
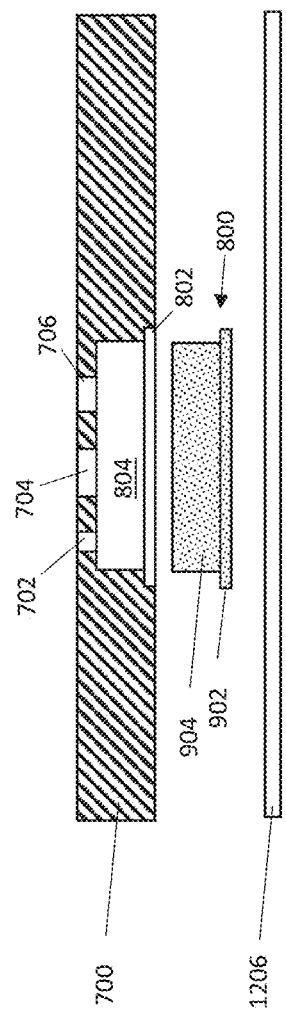
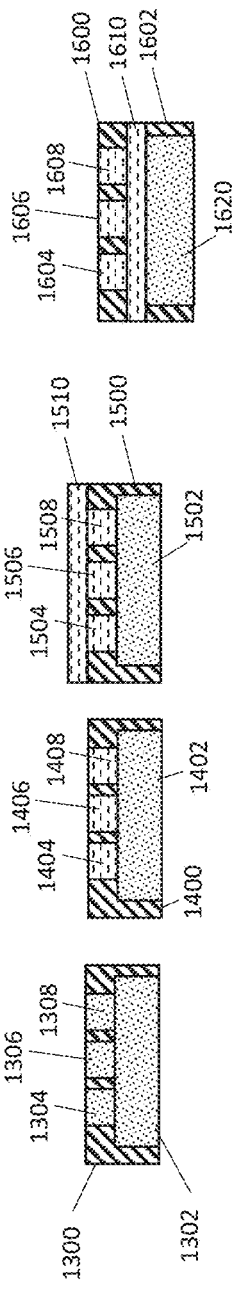

METAL, CERAMIC, OR CERAMIC-COATED TRANSACTION CARD WITH WINDOW OR WINDOW PATTERN AND OPTIONAL BACKLIGHTING

CROSS REFERENCE TO RELATED APPLICATIONS

This application is a National Phase application of International Application Ser. No. PCT/US2018/052832 filed Sep. 26, 2018, which claims the benefit of priority to, U.S. Provisional Application No. 62/573,789 filed on Oct. 18, 2017, U.S. Provisional Application No. 62/610,745 filed on Dec. 27, 2017, and U.S. Provisional Application No. 62/686,358 filed on Jun. 18, 2018, the contents of all of which are incorporated herein by reference in their entirety for all purposes.

BACKGROUND OF THE INVENTION

Transaction cards may have any number of features to differentiate one offering from another. Consumers have demonstrated a demand for metal cards because of their durability and overall luxury feel relative to plastic. Ceramic cards offer similar durability with a unique and desirable overall luxury feel.

U.S. Pat. Nos. 5,412,199; 5,434,405; 5,608,203, discloses a credit card having a plastic base material with a transparent area that forms a magnifying lens, such as a Fresnel lens, that permits the card to be used as a magnifying glass, such as for being able to read small print on transaction receipts. U.S. Pat. No. 6,902,116, discloses a transaction card having a transparent window in which the window has collimating properties to focus LED light.

U.S. Pat. No. 7,997,503 discloses a card having a plastic base with a transparent window having a fixed set of elongated segments printed on it, which when superimposed over a display of dynamic visual code combined with the set of elongated segments, reveals the visual code to a viewer looking through the window. Thus, such cards have printed information on the window, and the printed information on the window is functional in nature, in that the pattern must align with the elongated segments that are combined with the visual code.

Providing a card that is primarily metal, ceramic, or a ceramic-coated body, such as metal, enables cards with a certain look and feel (e.g. heft) not available with a plastic card, and providing a transparent window in such cards provides a desirable differentiation from other card offerings. Metal and/or ceramic cards are generally more expensive to produce, and therefore may be presented as a luxury card targeted to card holders who have a net worth above a certain threshold, who are members of a select group of high-value customers to the card issuer, and/or who are willing to pay a substantial annual fee. A carrier of such a luxury card may not wish to admit of any need for a magnifying glass, and thus may not desire for a transparent window with magnification or collimation. The carrier of such a card may prefer that the majority of the center of the transparent window have no printing that obscures the view through the card, or that the window be adorned with a decorative, non-functional pattern, rather than the functional pattern of elongated segments, such as the patterns described in U.S. Pat. No. 7,997,503, which patterns tend to be aesthetically unpleasing. Embedding a transparent window in a metal and/or ceramic frame may present different manufacturing and structural challenges and opportunities different from the types of cards described in the references noted above.

Users and producers of cards frequently wish to incorporate designs that are visibly and/or tactilely perceptible from at least one surface of a card. For example, U.S. Pat. App. Ser. No. 20060086802 discloses a gemstone-carrying card in which gemstones are embedded in a plastic card. Card issuers and cardholders may have an interest in creating designs that provide a look similar to a pattern of gemstones, without the labor-intensive steps and expense of having to embed numerous multiple individual gemstones in the card.

SUMMARY OF THE INVENTION

One aspect of the invention comprises a transaction card, comprising a metal, ceramic, or ceramic-coated body having a visual appearance, a thickness, a body front face, a body back face, and a window extending from the front face to the back face and having a periphery. An insert having an insert back face and an insert front face is disposed in the window with the insert front face visible in or through the window and the insert back face flush with the body back face. The insert front face has a different visual appearance than the metal, ceramic, or ceramic-coated body. A backing layer, preferably a non-metal backing layer, may be laminated to the back face of the body and the back face of the insert. In some embodiments, the insert comprises one of a non-magnifying transparent or translucent member having a front-facing surface disposed flush (or slightly above or below the surface within accepted ISO standard tolerances for flushness) with the body front face and having a periphery matching the periphery of the window, the transparent or translucent member optionally containing an electronic feature in or on the window, and having no functional printed content on or in the window other than optional printed conductive traces connected to the optional electronic feature; or a non-transparent, non-functional member having a front-facing surface disposed recessed relative to the body front face; or a combination thereof. The front face of the body may have one or more features printed thereon, such as a continuous peripheral printed line disposed on a portion of the transparent or translucent member immediately adjacent the body and a portion of the body immediately adjacent the transparent or translucent member, and extending across an interface between the transparent or translucent member and the body. In some embodiments, the transparent or translucent member is devoid of printed content. In other embodiments, a majority of the area of the transparent or translucent member is devoid of printed content but for the continuous peripheral printed line extending across the interface between the transparent or translucent member and the body.

The transaction card may have an electronic feature in or on the transparent or translucent member, printed conductive traces connected to the electronic feature, and a conductive interface connecting the conductive traces in the transparent or translucent member to conductive members in the body configured to transmit power and/or electrical signals to the conductive traces in the transparent or translucent member. In one embodiment, the electronic feature may be a contactless or dual interface payment module, and the transparent or translucent member may further include a coupling antenna disposed in the transparent or translucent member. The contactless payment module and coupling antenna may be partially obscured by or integrated with printed decorative content in the transparent or translucent member.

In an embodiment in which the body comprises metal and has a contactless payment module disposed therein, the transparent or translucent member may be located in a position on the body that improves RF performance of the card relative to a card with an absence of the transparent or translucent member.

In some embodiments, the window comprises a plurality of openings in the front face of the body disposed within a first area, and a single opening in the back face of the body defined by the first area. In such embodiments, the insert may consist of the non-transparent member, or may comprise the non-transparent member disposed beneath the transparent or translucent member. The non-transparent member may comprise, for example, plastic, metal, ceramic, wood, crystal, genuine or synthetic gemstones, mother-of-pearl, or leather, and may have graphics printed thereon. In some embodiments, an entirety of the front-facing surface of the non-transparent member is disposed recessed relative to the body front face and the windows are unfilled, such that the plurality of windows are tactilely perceptible in the front face of the card. In others, the windows are filled with epoxy. In still other embodiments, a plurality of portions of the front-facing surface of the non-transparent member protrude into the plurality of openings and are disposed flush with the front face of the body. In still other embodiments, an entirety of the front-facing surface of the non-transparent member is disposed recessed relative to the body front face, and the plurality of transparent or translucent members comprise an epoxy.

Another aspect of the invention is a process for manufacturing a transaction card. The process comprises the steps of providing a metal, ceramic, or ceramic-coated body having a thickness, a front face, and a back face, creating a hole in the body having a periphery and extending from the front face to the back face, positioning a non-metal backing layer adjacent the back face of the body. A non-magnifying transparent or translucent window insert having a front face, a back face, and a periphery, the periphery matching the periphery of the hole in the body, the insert having the same thickness as the body is created and disposed in the hole in the body with the back face of the insert in contact with the backing layer, and the backing layer is laminated to the body and the insert.

The body may comprise a metal sheet, and in such embodiments, the transaction card has a first area and the metal sheet has an area that is a multiple of the first area, wherein the process further comprises cutting the metal sheet into a plurality of cards corresponding to the multiple. The metal body may be coated with a ceramic coating, such as by spray coating only the front face of the body with the ceramic coating or by injection molding a ceramic coating around the metal body. In other embodiments, a body material other than metal (e.g. wood, carbon fiber, etc.) may be coated with ceramic. The process may further comprise a step of printing on the front face of the body, such as with an inkjet printer using UV curable ink, and then exposing the printing to UV radiation suitable to cure the ink. The process may include creating grooves in the front face of the metal body, including optionally filling the grooves.

The process may include disposing an electronic feature in or on the window, disposing conductive traces on or in the window, connecting the conductive traces on or in the window to the electronic feature, and disposing a conductive interface at an interface between the body and the window connecting the conductive traces in the window to conductive members in the body configured to transmit power and/or electrical signals to the conductive traces in the window. Disposing the conductive traces on or in the window may comprise printing the conductive traces or a surface of the window.

In an embodiment in which the body comprises metal and has a contactless payment module disposed therein, and the window may be located in a position on the body that improves RF performance of the card relative to a card with an absence of the window.

BRIEF DESCRIPTION OF THE DRAWINGS

FIG. 1A depicts the front face of an exemplary transaction card in accordance with one aspect of the invention, having a transparent window.

FIG. 1B depicts an exploded cross-sectional view of the card of FIG. 1A.

FIG. 1C depicts the rear face of the card of FIG. 1A.

FIG. 2 depicts an exemplary sheet from which a plurality of the cards of FIG. 1A may be cut.

FIG. 3 depicts an exemplary card with a window having electronics disposed thereon.

FIG. 4 depicts an exemplary card with a multi-layer window having embedded electronics.

FIG. 5 depicts an exemplary card with a window having embedded electronics.

FIG. 6 depicts an exemplary card with a window having embedded electronics and an embedded antenna.

FIG. 11 depicts a cross-sectional view of an exemplary card having a plurality of window openings on the front face.

FIG. 12 depicts a cross-sectional view of the exemplary card of FIGS. 7-9.

FIG. 13 depicts a cross-sectional view of the window region of an exemplary card embodiment in which the plurality of window openings are filled or partially filled with protruding insert material.

FIG. 14 depicts a cross-sectional view of the window region of an exemplary card embodiment in which the plurality of window openings are filled or partially filed with a translucent or transparent material different than the insert material.

FIG. 15 depicts a cross-sectional view of the window region of an exemplary card embodiment in which the plurality of window openings are filled or partially filed with a translucent or transparent material protruding from a layer or coating disposed on the front face.

FIG. 16 depicts a cross-sectional view of the window region of an exemplary card embodiment in which the plurality of window openings are filled or partially filed with a translucent or transparent material protruding from a layer or coating disposed beneath the front face.

FIG. 17 depicts a cross-sectional view of the window region of an exemplary card embodiment in which a plurality of window openings are filled or with a translucent or transparent material from layers or coatings disposed on top of the front and back faces.

DETAILED DESCRIPTION OF THE INVENTION

Figure 7:
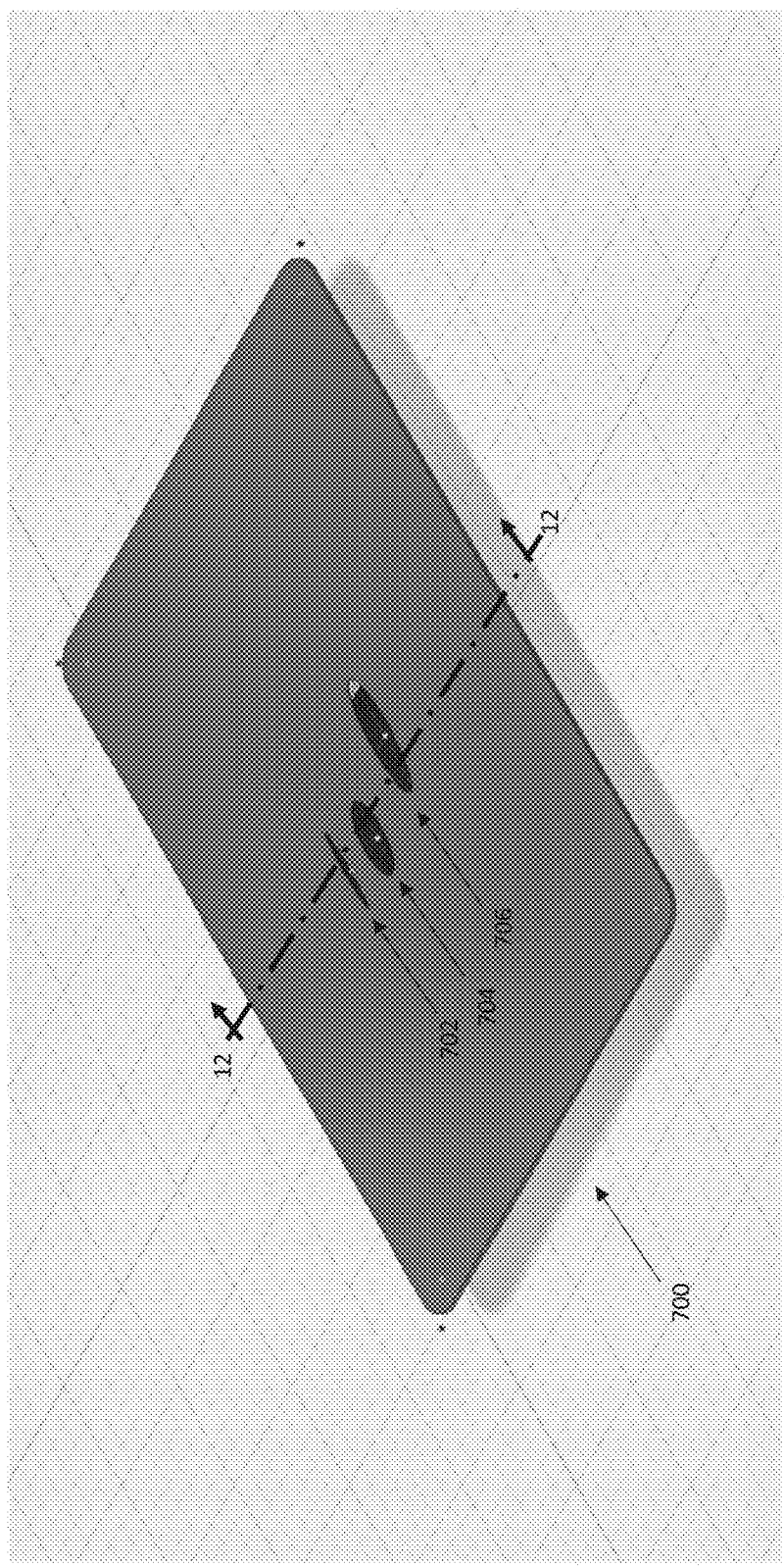
FIG. 7 depicts a perspective view of a front face of an exemplary card embodiment having a plurality of window openings.

Referring now to the drawings, FIGS. 1A-1C depict an exemplary transaction card 100 comprised of a relatively thick body 102, a window insert 112, and a backing layer 120. Body 102 has a thickness (T), a front face 104, a back face 106, and a hole 108 extending from the front face to the back face. As depicted in FIGS. 1A and 1C, hole 108 has a circular periphery, but it should be understood that the periphery of the hole may take any geometric form (oval, triangular, square, rectangular, or any regular or irregular polygonal form having 3 or more sides), or it may have a periphery comprising a combination of curved and/or linear sections that do not conform to any of the foregoing geometric categories. It should also be understood that the transparent or translucent window(s) may be any size as characterized by its overall area, so long as its overall area is less than the area of the body 102, and preferably fully contained within the area of the card (i.e. the periphery of the window is located entirely radially inward of the periphery of the body).

Non-magnifying window insert 112, having a front face 114, back face 116, the same thickness (T) as the body 102, and a periphery matching the periphery of hole 108, is disposed in the hole. The window may be both non-magnifying and non-collimating. By "matching" periphery, it is meant that the window insert has an identical periphery as the periphery of the hole, but is sufficiently smaller in diameter (or the equivalent thereof) to be inserted in the hole without having to force fit it, leaving no gap, or a gap that is minimal and nearly imperceptible to the human eye, at the interface between the inside edge of the hole and the outer edge of the insert. Similarly, by the "same" thickness, it is meant that the window insert and the metal body are of the same thickness to a desired level of precision within an acceptable tolerance, recognizing that such a tolerance may include a difference in thickness that is perceptible to the human touch or a difference in thickness that accounts for the thickness of the printed layer on the body.

In some embodiments, the window insert is devoid of functional printed content on either its front or back face (or embedded therein). By "devoid of functional printed content," it is meant that the insert in some embodiments has no content printed on it whatsoever (not shown), or in other embodiments, any content printed thereon (e.g. ship graphic 118 depicted in FIG. 1) is purely decorative in nature and not, for example, for use in connection with an authentication or verification scheme implemented by placing the window over a corresponding graphic. Instead of or in addition to printing, the graphics or other content disposed in the window may also be engraved, etched, or otherwise cut into the window. Engraved, etched, or otherwise cut content in the window may also be non-functional, including aesthetic content in the nature of 3D reliefs, such as to provide a cameo-like appearance. In other embodiments, as described further herein, the window may comprise electronics (e.g. an LED) mounted thereon or therein, in which case preferably "invisible" or minimally visible (not visible to the naked human eye in ambient lighting without careful inspection) traces may be printed or otherwise disposed on or in the window. Such traces may connect the LED to electrical traces in the body, which traces in the body may connect to a concealed power source in the body or may connect to a source and/or recipient of electrical signals. In some embodiments, the LED may comprise a backlit LED. The window may comprise a light guide that transmits light from a light source, such as an LED located at an input surface of the light guide to an output surface of the light guide. While it is understood that all electrical signals have some inherent power, the term "power" as used herein refers to power for powering the electrical feature, whereas the term "electrical signals" as used herein refers to a signal that is not for providing power, but rather for communicating information. Thus, the electrical impulses traveling to and from the electrical feature to any connected components may comprise power, electrical signals, or a combination thereof.

By "non-magnifying," it is meant that the window insert is not functional as a magnifying lens (i.e. objects at a given distance viewed through the window insert appear the same size than if not viewed through the window). By non-collimating, it is meant that the window does not focus radiation of any wavelengths (not limited to visible light) that pass through the window toward a focal point. The window may be light dispersing. The window insert is non-metal, and preferably comprises polished polycarbonate, but may comprise glass or any transparent plastic or resin known in the art. In some embodiments, the window insert may have a primarily transparent or translucent region with one or more different materials inlaid inside it, such as for example, metal, ceramic, wood, crystal, genuine or synthetic gemstones, mother-of-pearl, leather, or the like. Although referred to herein as "transparent," the window may cause sufficient light scattering and diffusion that objects viewed through the window are not visible with perfect clarity. The window alone is more transparent than the combination of the window and the backing layer (and any layers on top of the window). The materials of the window insert may be selected to lie anywhere in the range between translucent (where objects viewed through the window cannot be seen clearly at all) and transparent (where objects viewed through the window can be seen clearly). At a minimum, the window is translucent to the spectrum of light visible to the typical human eye (i.e. wavelengths from about 390 to 700 nm; and frequencies in the range of about 430-770 THz). In preferred embodiments, the window is not tinted. Thus, for example, when stacked in a cardholder's wallet, the window may permit the user to see the card located immediately below it with some clarity.

In some embodiments, it may be desirable for the window to be electrically conductive or to have electrically conductive features. For example, in some embodiments, the window may comprise glass or another non-conductive material, such as a plastic resin, coated with a conductive coating, such as an indium-tin-oxide coating or an electrically conductive ink. In other embodiments, the window may comprise in whole or in part an electrically conductive plastic (i.e. polycarbonate or another plastic material formed from a conductive plastic resin).

In some embodiments, as depicted in FIGS. 3 through 6, card 300, 400, 500, 600 may have electronics 310, 410, 510, 610 such as an integrated circuit, an LED inlay, a switch, or any other electronic feature known in the art, incorporated in the window 320, 420, 520, 620 with "invisible" traces 330, 430, 530, 630 comprising ITO or other printed conductive inks or adhesives, which may connect the electronics to electrical connections 340, 440, 540 at the interface between the window and the body 350, 450, 550 at the periphery of the hole. In some embodiments, the electrical connections 340, 440, 550 may then connect to a power source 360, 460, 560, such as a battery or an antenna for harvesting RF power. Thus, for example, an LED display, such as for showing a dynamic code, or for emitting light to provide an indicator of card operability (e.g. illuminated when information is being actively read from the card), may be bonded to or embedded in the window and connected to connection points at the edge of the window with ITO or other printed traces. Electronics may be bonded to the window with a conductive adhesive in whole or just in portions requiring conductivity and/or with non-conductive adhesive in whole or just in portions intended to be non-conductive). The use of printed conductive traces using a thin conductive material that is transparent, translucent, or minimally visible, allows incorporation of electronics in the window without unsightly, readily visible wires or copper traces.

In embodiments with an electrically-powered feature in the window, in which power is supplied to the feature from a power source embedded in the body, as depicted in FIGS. 3 through 5, the power may connect to the feature inductively or by physical traces, wherein physical traces in the body connect to physical traces in the window across a conductive interface that bridges any gap between the window and the body. The conductive interface 335, 435, 535 may comprise, for example, solder, wire bonding, conductive ink or a conducting adhesive (such as a conducting adhesive patch or ACF tape). The conductive interface 335, 435, 535 and any traces 340, 440, 540 embedded in a metal body 350, 450, 550 are insulated from the metal body by any insulation and methods for disposing the insulation, known in the art. For example, as is known in the art, traces 340, 440, 540 may comprise copper traces disposed on a flexible non-conductive substrate disposed in a groove in the body. The conductive interface may simply comprise connecting endpoints of the connecting traces (e.g. 330 and 340) or may be somewhat larger than the connecting traces to facilitate alignment when the window is inserted in the hole. Applying the conductive interface 335, 435, 535 in the form of a solder bump applied to bridge the gap between traces 330, 430, 530 in the window and traces 340, 440, 540 in the card after insertion of the window may be particularly effective. To facilitate alignment of electrical connections, the hole and corresponding insert may be non-round or may be keyed, such as with a protrusion in the window that mates with an indent in the hole (or vice versa), so that the insert fits the hole in only a single or limited number of readily differentiated orientations.

In the embodiment depicted in FIG. 6, the electronic feature 610 disposed in the window 620 may be powered entirely by harvesting RF from a card reader inductively, wherein antenna 630 is also disposed in the card and connected to the electronic feature without a need for connection to a power source embedded in the body 650. Thus, for example, wherein electronic feature 610 is an illuminating feature activated when the card is being read, antenna 630 harvests sufficient electricity to power the light and needs no connections to any other features embedded in the card. In other constructions, electronic feature 610 and/or antenna 630 may be disposed on a surface of the card rather than embedded. In other embodiments, electronic feature 610 and/or antenna 630 may be connected inductively (or physically by connections akin to any of those shown in FIGS. 3 through 5) to features embedded in the body, such as a power source or, for example, in an embodiments in which the electronic feature is a dual-interface chip, to contacts (e.g. contacts 160 depicted in FIG. 1) for being read by a contact-based reader.

Window Pattern Embodiments

In another aspect of the invention, the transaction card may comprise a plurality of openings in the front face of the card, as depicted in FIGS. 7-17. Specifically, as shown in FIG. 10A, the plurality of window openings 1010 in card body 1000 form a geometric graphic pattern in the shape of a sphere. As shown in FIG. 10B, the plurality of window openings 1022, 1024, 1032 in card 1020 collectively form an alphanumeric character in the shape of a stylized Q associated with a particular brand of card. As shown in FIG. 10C, each of the plurality of window openings 1052 comprises an alphanumeric character arranged together such that the window openings spell a word associated with a particular brand of card. The openings are depicted generically in FIGS. 7-9 as a collection of different ellipses, and in the cross-sections of FIGS. 11-15, they have no identifiable geometry. The pattern and the shapes, sizes, and number of openings that form the pattern, are not limited in any way. The openings may form a recognizable pattern or an abstract pattern. The openings are preferably merely aesthetic in nature and do not serve any function other than to create a suitable pattern or design, which pattern or design may be user-selected or may be selected for difficulty of reproduction. Thus, while the pattern or design may enhance security of the card in a passive way in that the pattern or design by its very existence provides a mark of authenticity that is difficult to reproduce, preferred patterns or designs are referred to herein as "non-functional" because they have no active or interactive functionality.

Figure 8:
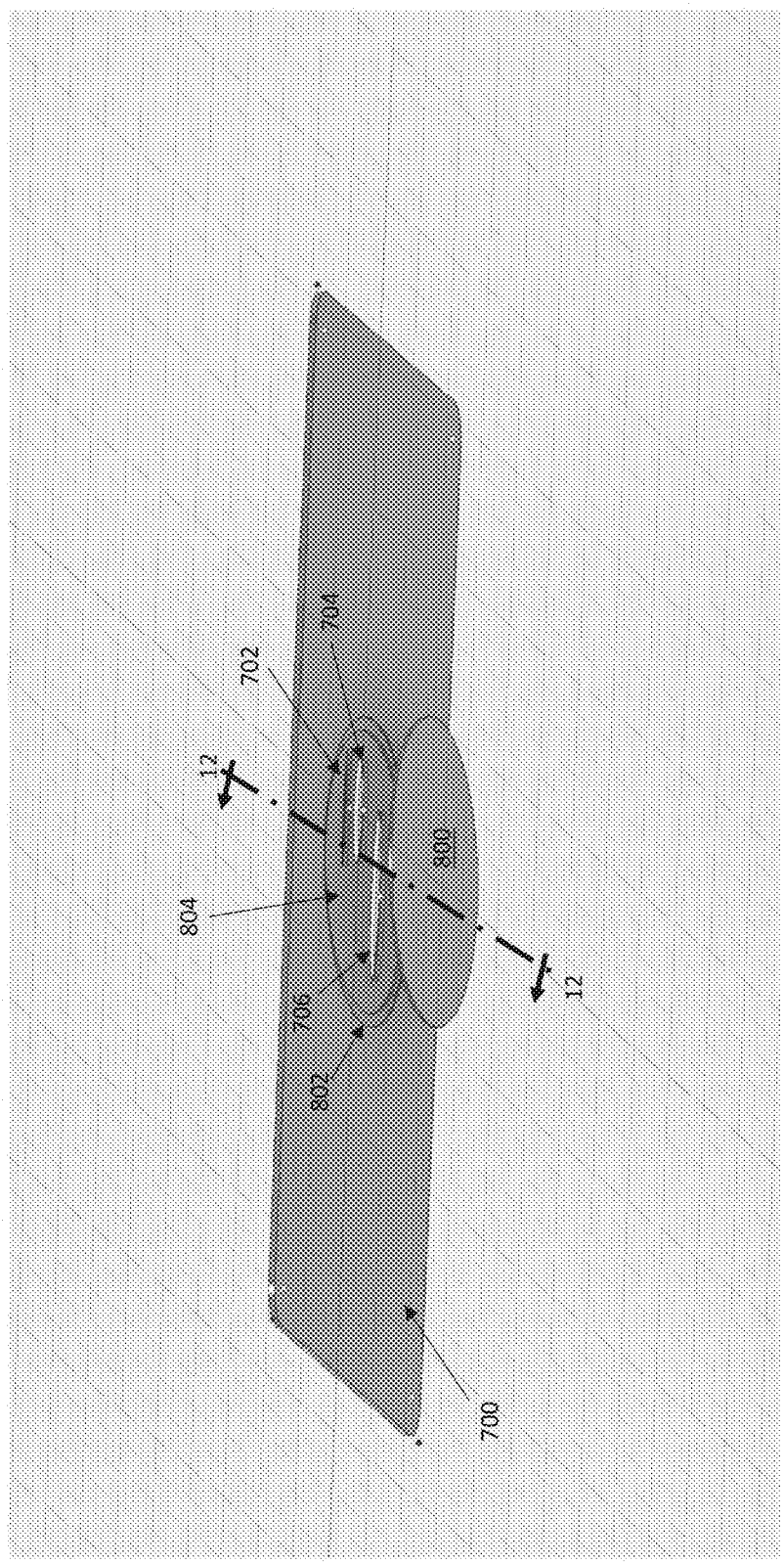
FIG. 8 depicts a perspective view of the back face and insert of the exemplary card of FIG. 7.
Figure 9:
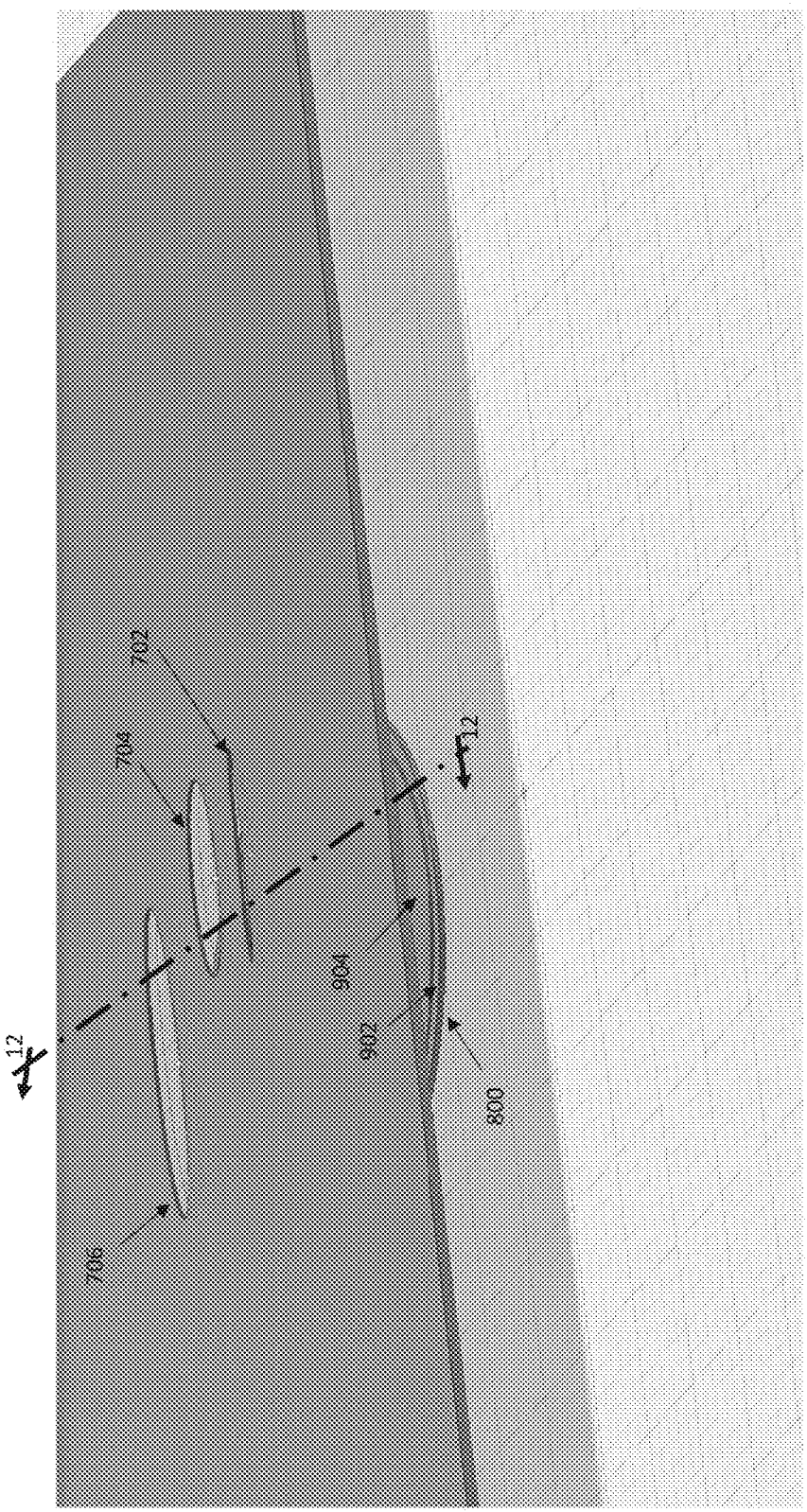
FIG. 9 depicts a perspective close-up view of the body front face and insert front face and outer periphery of the exemplary card of FIG. 8.

As depicted in FIGS. 7-9, card body 700 has a plurality of window openings 702, 704, and 706 that penetrate the front face of the card body. Although referred to as the "front" face here and in the claims that follow, the term "front" as used herein in connection with this and other embodiments refers to the side of the card on which the window openings are disposed, which may be side traditionally referred to as the "front" or the "back" side of a functioning card having a magnetic stripe, contacts, and other indicia that may be typically understood to differentiate the "front" and the "back" of the card. Each opening has a different periphery visible from the front side of the card, but all of the windows are located in an area defined by pocket 804, depicted in FIG. 8, which pocket defines a single opening in the back face of the card. Insert 800 is configured to be disposed in pocket 804. As depicted in FIGS. 8, 9 and 12, card body 700 has a recessed ledge 802 in the back face surrounding the single opening 804, wherein the insert 800 comprises a stepped periphery comprising an outermost region 902 having a geometry configured to mate with the recessed ledge, and an innermost region 904 configured to fit within the single opening.

In another embodiment, depicted in FIG. 11, the body may comprise at least two layers, including a first layer 1100 that defines the front face 1150 of the body, and a second part 1102 that defines the back face 1152 of the body. The plurality of openings 1110a, 1110b, 1110c penetrate the entire thickness of the layer 1100, whereas a single opening 1120 penetrates the entire thickness of layer 1102. Insert 1104 is configured to fit within opening 1120, which defines a pocket when layers 1100 and 1102 are combined together.

Although not shown with a recessed ledge in layer 1102, and corresponding outer peripheral region on insert 1104, this feature may also be present in this embodiment. Although depicted as having the same thickness in FIG. 11, the two layers 1100 and 1102 may have different thicknesses, and either one may be larger than the other. The layers may be adhesively bonded together. Additional layers may also be present, including a transparent or translucent bonding layer between layers 1100 and 1102, that when fills the plurality of openings 1110*a*-1110*c* during a lamination step. Backing layer 1106 may be laminated or otherwise bonded to the back face of the layer 1102 to keep insert 1104 in place.

As shown in FIG. 11, the insert may consist of member 1104 alone. In some embodiments, member 1104 and backing layer 1106 (and any intermediate or over layers) may be transparent or translucent, such that light is visible through the openings 1110*a*-1110*c*. In preferred, embodiments, however, insert 1104 comprises a non-transparent member that is chosen for aesthetic impact. For example, insert 1104 may comprise plastic, metal (e.g. having different visual properties than any visible metal in the body), ceramic (e.g. having different visual properties than any ceramic or ceramic coating comprising the body), wood, crystal, mother-of-pearl, stone (including artificial or natural gemstone), natural or synthetic bone or ivory, and natural or synthetic leather. Any of the foregoing may have printing on them (e.g. a printed plastic insert having a graphic that provides visibility into different colors through different openings). Typically, the non-transparent member is opaque, but in other embodiments, it may have some translucence. Member 1106 may have printing on one or both sides, including in some embodiments, printing visible from one surface of the card that is different from the printing visible from the opposite surface of the card. Typically, member 1104 is passive and static, but it may be dynamic, such as a member that is photoluminescent (e.g. that glows in the dark or fluoresces when illuminated by light of a certain wavelength). Member 1104 may also be a light source, such as an LED, such as more specifically a backlit LED, connected to a power source (not shown) in the same way as described herein for other elements connected to a power source. In still another embodiment, member 1104 may be a light guide that receives light input from a light source, such as an LED or backlit LED (not shown), at an input surface of the light guide and transmits the light to an output surface. The light may cooperate with the windows to create a pattern that illuminates to indicate, for example, reading of the payment module, but is not limited to any particular purpose.

In other embodiments, member 1104 may be an active or dynamic member such as is described in U.S. Prov. App. Ser. No. 62/545,630, titled "CARD WITH DYNAMIC SHAPE MEMORY ALLOY TACTILE FEATURE," incorporated herein by reference. Member 1104 may be different from the body in any number of ways, including color, texture, reflectance, opacity, and combinations thereof.

As depicted in FIG. 12, the insert may consist of only a single member 800 in which, when the card is assembled, an entirety of the front-facing surface of the member is disposed recessed relative to the body front face, meaning the plurality of windows 702-706 are tactilely perceptible in the front face of the card. Thus, for example, when the insert 800 comprises mother-of-pearl, lamination of the card will not change this physical relationship among the components. Although preferably non-transparent, member 800 may be transparent in some embodiments.

In other embodiments, however, as depicted in FIG. 13, the insert 1302 may comprise a material that is flowable at lamination temperatures, and that may partially or fully flow into the plurality of openings in body 1300 during a lamination step, such that a plurality of portions 1304, 1306, 1308 of the front-facing surface of the non-transparent member protrude into the plurality of openings and are disposed flush with the front face of the body.

In still other embodiments, depicted in FIG. 14, an entirety of the front-facing surface of the non-transparent member 1402 may remain disposed recessed relative to the body front face, and a plurality of transparent or translucent members 1404, 1406, 1408 may be disposed in the openings. The transparent or translucent members may comprise an optically clear epoxy that is deposited via automated dispensing in the openings.

In yet other embodiments, depicted in FIG. 15, a transparent or translucent layer 1510 may be disposed over the front face of the body 1500 and over the plurality of openings such that protrusions 1504, 1506, and 1508 from the layer fully or partially flow into the openings during a lamination step, with layer 1502 remaining in its entirety recessed relative to the body front face.

As depicted in FIG. 16, in a multilayer body construction, an intermediate transparent or translucent bonding layer 1610 may be disposed between the first layer 1500 and second layer 1502 of the body such that protrusions 1604, 1606, and 1608 fully or partially flow into the openings during a lamination step, with layer 1620 remaining in its entirety recessed relative to the body front face.

As depicted in FIG. 17, transparent or translucent layers 1702 or 1704 disposed over the front face and back face of body 1700, respectively, may together fully or partially flow into the openings 1710, 1712 during a lamination step. This structure and manufacturing method may be particularly well suited for embodiments in which openings 1710 and 1712 are slits, such as the window features 1022, 1024, 1032, 1052 depicted in FIGS. 10B and 10C. Although shown with upper and lower layers, some embodiments may have only one or the other. Although shown with a single discrete upper and a single discrete lower layer, some embodiments may have multiple layers above and/or below the body, and in some of those embodiments, more than one of the layers may contribute to filling the openings. For example, an adhesive layer, which may comprise a carrier with adhesive on both sides, may be interposed between the body and each of the upper and/or lower layers, and the adhesive, the carrier, and the upper or lower layer may all flow into the openings during a lamination step. In other embodiments, adhesive on the underside of the carrier (or disposed directly on the underside of the upper and/or lower layers) may be the only material that flows into the openings.

Although shown with coplanar faces in FIG. 17, it should be understood that the flow of material may lead to convex, concave, coplanar, or irregular shaped surfaces of the flowing material on one or both faces of the card. The formation of convex, concave, coplanar, or irregular shaped surfaces may occur in any embodiments in which material flows into the windows/grooves/pockets, and the overall shape may be deliberately controlled to have a particular shape. Similarly, in embodiments in which inserts are pre-formed and assembled into the window/grooves/pockets, the inserts may also conform to any of the foregoing shapes.

Although all of FIGS. 13-17 depict a monolithic body, it should be understood that the body in these embodiments may comprise a multi-layer body, such as is depicted in FIG. 11.

Referring, for example, to FIG. 12, methods and processes for making cards with a window pattern may comprise providing a metal, ceramic, or ceramic-coated body 700) and creating a pocket 804 in the body having a periphery and extending from the back face to a location adjacent the front face; then creating a plurality of openings 702, 704, 706 extending from the front face into the pocket, the plurality of openings forming a pattern. Insert 804 is positioned in the pocket, and then a non-metal backing layer 1206 adjacent the back face of the body and a back face of the insert is laminated to the body and the insert.

In some embodiments, such as depicted in FIG. 11, the step of providing the body may comprise providing a first layer 1100 that defines the front face of the body and a second layer 1102 that defines the back face of the body. In such embodiments, the step of creating the pocket comprises creating a through hole 1120 in the second layer 1102, and the step of creating the plurality of openings comprising creating a plurality of through holes 1110*a-c* in the first layer 1100. The openings, pocket, and through holes referred to in these processes may be laser cut, milled, etched, or machined by any method known in the art. For ceramic-coated embodiments, a metal or other material body or body layers may be first coated with ceramic and then the various openings cut and the layers assembled, or the openings may be first cut in the metal or other body and/or the layers assembled, and then the ceramic coating may be applied to the outer surfaces before assembly of the rest of the components.

As depicted in FIG. 12, the process may comprise creating a recessed ledge 802 in the back face of the body surrounding the pocket 804, and forming the insert 800 with a stepped periphery comprising an outermost region 902 having a geometry configured to mate with the recessed ledge 802, and an innermost periphery 904 configured to fit within the pocket 804.

The step of positioning the insert in the pocket may comprise bonding the outermost region of the insert to the recessed ledge in the body, such as with an adhesive or via non-adhesive mechanical bonding, such as using ultrasonic welding, brazing, or soldering. Using the ledge design in conjunction with a bonding material such as an adhesive, solder, or a brazing alloy, permits bonding on the ledge in a way that minimizes the adhesive or other bonding material flowing into the openings in the front face of the body. In other embodiments, however, it may be desirable for the bonding material, such as a hard-drying clear epoxy, to flow into the openings and fill them to create transparent windows, such as is depicted in FIG. 14, in which case no ledge may be desired. Other methods of filling the plurality of openings with clear epoxy may include automatically dispensing the epoxy into the openings after the insert is already in place. Still other methods of filling the openings with a transparent or translucent material may comprise disposing a transparent or translucent coating (such as via lamination of a solid layer, or by application of a spray coating or a liquid layer) over the front face of the body and at least partially filling the plurality of openings with a portion of the clear coating that flows into the plurality of openings, such as during the lamination step.

As noted above, in embodiments in which the insert comprises a material that is flowable during lamination, the process may comprise conducting a lamination step at sufficient heat and pressure to cause protrusions from the insert to fully or partially flow into the plurality of openings during the lamination step. In embodiments with slits, such as those depicted in FIGS. 10B, 10C, and 17, the openings may be etched, milled, or created by a laser (although not limited to any particular manner of formation).

Figure 10A:
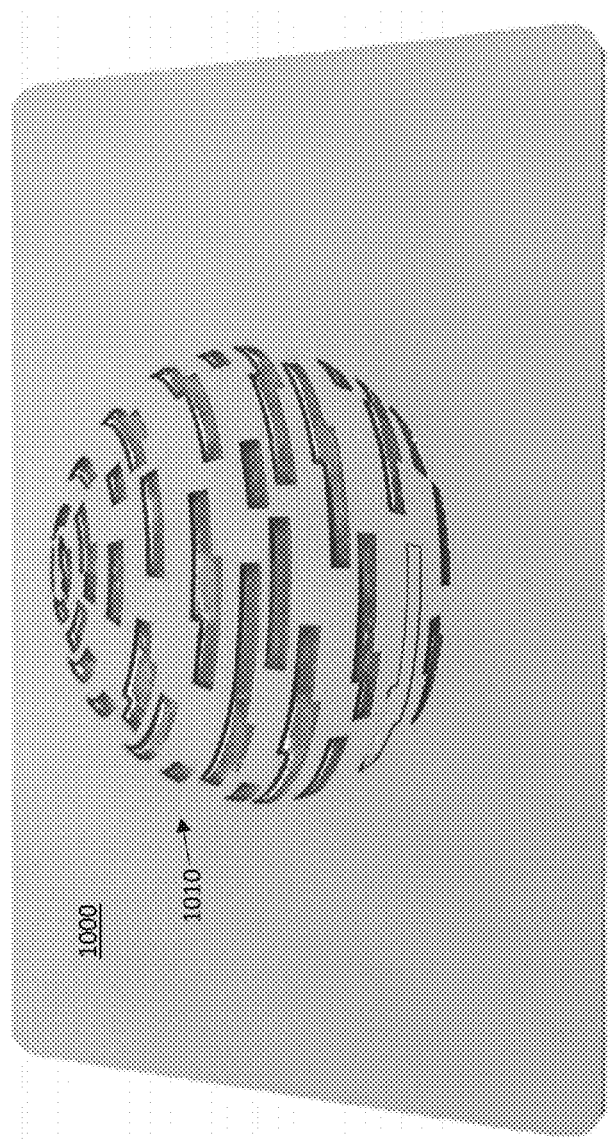
FIG. 10A depicts a plan view of an exemplary card having a plurality of window openings cut into a pattern.
Figure 10B:
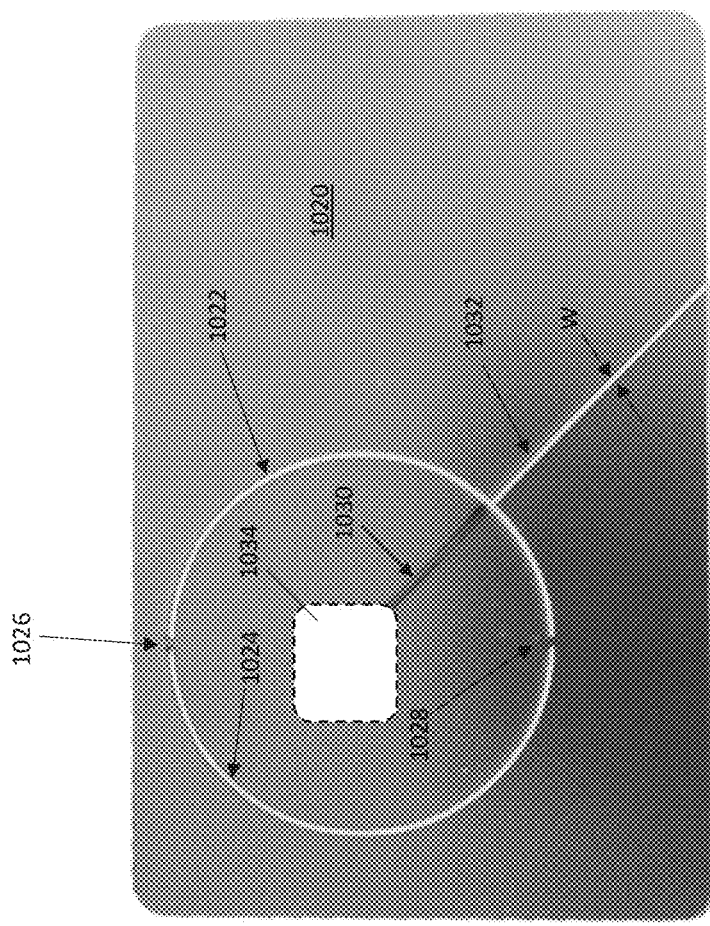
FIG. 10B depicts a plan view of an exemplary card having a plurality of narrow slit window openings cut into a pattern that collectively forms an alphanumeric character.
Figure 10C:
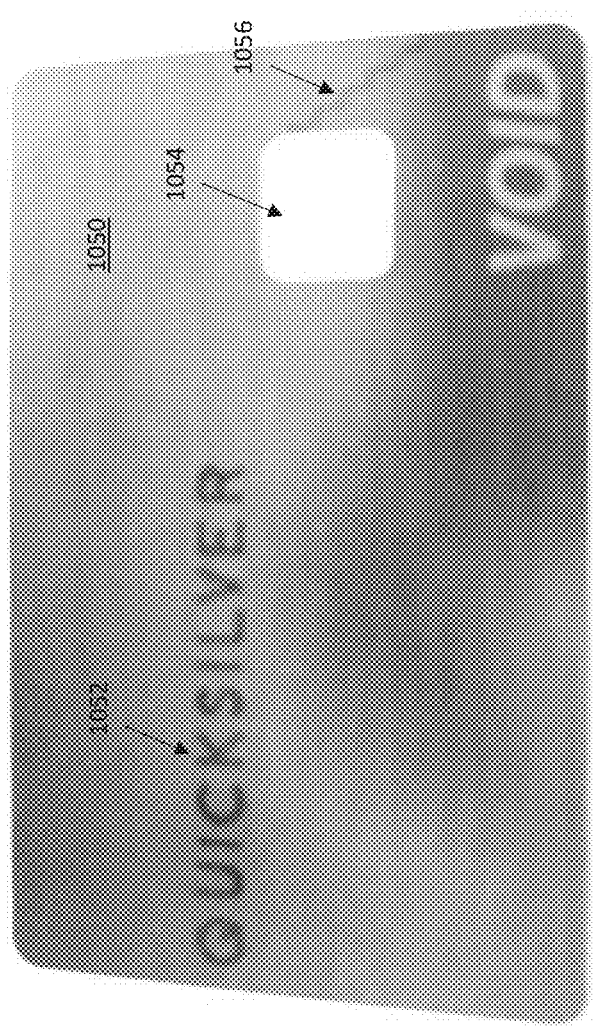
FIG. 10C depicts a plan view of an exemplary card having a plurality of narrow slit window openings each cut into a pattern of an alphanumeric character.

As depicted in FIG. 10B, for ease of manufacture, the step of creating the slit 1032 may include creating a continuous slit defined by portions 1030 and 1032 that extends from payment module pocket 1034 to an edge of the card. If portions of the slit are not desired to be transparent or translucent for aesthetic reasons, such as portion 1030, such portion may be filled with a different type of filler, such as a non-conductive filler that is not transparent or translucent. Such a fill step would be conducted prior to the lamination step that fills the transparent or translucent window portions. The continuous slit defined by portions 1030 and 1032, filled with a non-conductive, card-matching filler in portion 1030 and filled with a non-conductive, transparent filler in portion 1032, may be operable to enable metal frame 1020 to serve as an amplifying antenna or coupling frame, as disclosed in U.S. application Ser. No. 15/928,813, incorporated herein by reference in its entirety. As shown in FIG. 10C, in other embodiments, slit 1056 emanating from the module pocket 1054 in card 1050 may be a separate element that is not integrated into the manufacture of the design defined by the transparent or translucent windows 1052.

It should be understood that creating an extended opening and filling a portion with a transparent or translucent filler and another portion with a non-transparent/non-translucent portion as depicted in FIG. 10B is not limited to embodiments in which the slit as a whole connects the payment module pocket to the edge of the card. For example, it may be desirable for ease of manufacture to create a continuous slit and then fill portions of the slit with different fillers for purely aesthetic reasons, and the different fillers may be of any type. For example, fillers may be transparent, translucent, opaque, conductive, non-conductive, or some combination thereof, with different sections of the same continuous opening (or different discrete openings) having different fillers, each filler having a different aesthetic appearance, such as different colors, different textures, and the like. If desired, the filler may comprise a precious metal, such as gold. In other cases, the windows or portions thereof may be illuminated, such as using an LED, as described herein or in any way known in the art. The "filler" (and the insert material) may completely fill or partially fill all or some of the openings in any of the embodiments disclosed herein.

Figure 18:
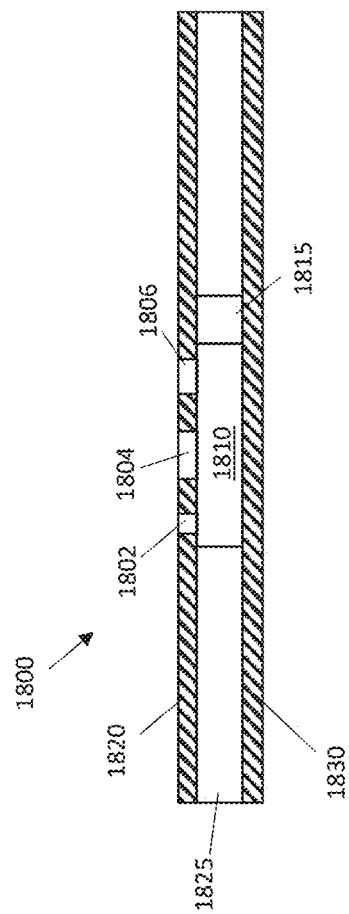
FIG. 18 depicts a cross-sectional view of a window region of an exemplary card embodiment in which a light guide transmits light through the plurality of window openings.

In one embodiment, depicted in FIG. 18, a light guide layer 1825, comprising a light guide 1810 and a light source 1815, such as a backlit LED, may be sandwiched between metal layers 1820 and 1830. LED 1815 is positioned adjacent an input to the light guide and the windows 1802, 1804, and 1806 are positioned adjacent an output surface of the light guide. Light from the LED 1815 shines into the light guide and is transmitted out through windows 1802, 1804, 1806. Although depicted in one embodiment in FIG. 18, it should be understood that embodiments with a light guide disposed beneath apertures in a metal layer may be provided in any of the other configurations described herein. Windows 1802, 1804, 1806, may have no filler or a transparent or translucent filler, and may be formed via any of the methods or conform to any of the structures described herein.

In some embodiments or designs, rather than creating a continuous slit, such as for the circular shape formed by slits 1022 and 1024, it may be more desirable to create discrete slits with one or more bridges 1026, 1028 of metal between them, for overall structural stability of the card. As depicted in FIG. 10B, the absence of bridges 1026 and 1028 would completely separate the central circular portion from the rest of the metal body. Providing metal separations between adjacent slits is not limited only to embodiments that would prevent separation, however.

As used herein, the term "slit" refers to a gap formed between metal edges, wherein the distance from edge to edge is generally small enough that it is undesirable or impractical to place a separate fill material in the slit prior to a lamination step, and such that the risk of air bubbles forming during lamination is minimal. Lamination conditions can be controlled as desired so that the slit is filled by the overlying and underlying layers without leaving a noticeable indent or partially filled to provide a tactilely distinguishable indent.

Other Card Features

In embodiments in which the card body is metal or ceramic coated metal, and the transaction card comprises a payment module configured for "contactless" interface with a card reader (e.g. in which, in at least one operating mode, the payment circuit embedded in the card inductively couples to a card reader using RFID technology), positioning the window adjacent the module may enhance RF performance of the card, thereby lengthening the distance at which the card may be read in a contactless mode. Specifically, the absence of metal adjacent the module, specifically near the module antenna, may significantly improve (lengthen) the read distance between the card and the card reader required to couple the card and the card reader relative to a card without the transparent window. Optimal distances may be determined by creating a plurality of otherwise identical cards with different window sizes and locations and testing the difference in read distance of the different designs. Generally, the applicant has found read distance percentage improvements in the range of 12-50%, depending upon the distance in a range of 1-5 cm between the edge of a metal card and a module. Accordingly, an absence of a significant metal area within that 1-4 cm distance due to the hole in the metal body to accommodate the window is expected to provide a measurable level of improvement.

In some embodiments, the payment module may be located inside the transparent window, in which case a coupling antenna may be positioned surrounding the module using minimally visible traces inside the transparent window. In other embodiments, the entire metal card body may be used as the coupling antenna or a coupling antenna may be embedded in the body, as is known in the art. The minimally visible traces, including antenna traces, and the module may be obscured with or integrated into graphic content in the nature of a printed design on the window. Positioning of the card reader module within the window is not limited to metal or ceramic-coated metal embodiments, however, and may be present in embodiments featuring an all-ceramic or ceramic-coated non-metal body, also.

As shown in FIG. 3, the electronics 310 and any connecting traces 330 may be disposed on a surface of the window, preferably on the back surface of the window where the electronics can be further covered and protected by the backing layer. As shown in FIGS. 4 and 5, in alternate embodiments, electronics 410, 510 may be embedded in the window 420, 520. In one embodiment, depicted in FIG. 5, embedded electronics may be embedded by injection molding of the electronics 510 within a transparent or translucent polymer that comprises window 520. In such an embodiment, one or more conductive members 532 connected to the electronics, may be disposed in the window oriented in a direction along the thickness of the window (perpendicular to the front and back faces of the window) so as to transmit electrical power and/or signals from an internal portion of the window to a surface 522 of the window (or a layer closer to the surface of the window), where that conductive member 532 connects to conductive traces 530 printed on the window. Exemplary processes for embedding electronics for insertion in a metal card body are described in U.S. Provisional Application Ser. No. 62/555,367, titled "TRANSACTION CARD WITH EMBEDDED ELECTRONIC COMPONENTS AND PROCESS FOR MANUFACTURE," incorporated herein by reference.

In another embodiment, depicted in FIG. 4, the electronics may optionally be disposed on a first layer 422 of transparent or translucent polymer, with a second layer 424 disposed thereon to envelop the electronics (and optionally, one or more conductive lines 430 for connecting to the electronics). A multi-layer window is not limited to only two layers, and may include any number of layers that may provide the aesthetic or functional qualities desired. In a multi-layer embodiment, the conductive lines 430 may be printed on a first layer 422 before another layer (e.g. 424) is disposed.

Non-metal backing layer 120 (e.g. a transparent PVC, but not limited to any particular materials of construction), which is relatively thinner than the relatively thick base, is preferably laminated to the back face of the body and the back face of the window. Although not limited to any particular ranges of thickness, transactions cards are generally standardized in size approximately a thickness of 0.032 inches, and the body is typically in a range of 0.008 to 0.028 inches, preferably in a range of 0.010 to 0.020 inches, more preferably, 0.012 to 0.018 inches, with the backing layer optionally having a thickness to make up the difference between the overall thickness and the body, minus the thickness of any adhesive layers or other coatings.

One or more features may be printed on the body, which may comprise a printable metal such as printable stainless steel (e.g. stainless steel having a coating (not shown) at least on front face 104 that improves acceptance of printing inks on the steel surface). The coating may comprise, for example, a polyester based coating receptive to UV curable screen and inkjet inks or solvent or oxidation printing. In other embodiments, dye or sublimation printing may be used. For embodiments with a ceramic body, or a ceramic-coated body, the ceramic may be similarly coated, roughened (such as chemically, mechanically, or with a laser), to receive a printed layer. Printed embodiments are not limited to any particular printing technology or technique.

As depicted in FIG. 1A, the front face of the card may have a decorative pattern. The decorative pattern may be a printed pattern (or may be an engraved or etched pattern, as further explained below), or the front face may be printed with a solid color (e.g. black as shown in FIG. 1A), or may comprise some combination of solid color, printed graphics or patterns, printed information, and engraved or etched patterns, graphics, or information. Printed information may include the name of the card issuer (e.g. Citi, Bank of America, etc.—represented by the text "BANK" in FIG. 1A), the type and/or name of the card (e.g. VISA® SAPPHIRE, AMERICAN EXPRESS®, etc.—represented by the text "CARD NAME" in FIG. 1A), the name of the cardholder, a unique serial number of the card, expiration date, and the like. Certain printed information (e.g. graphics, name of the card) may be printed in a first printing step to create a card "blank" ready for personalization, and other printed information (cardholder, serial number, expiration date) may be printed in a second personalization printing step. The first and second printing steps are typically performed geographically and temporally distant from one another and by different printers. The printing may extend to printing on the window insert, including the printing across the interface between the periphery of the window and the periphery of the hole. The printing may be performed using UV curable inks, but the invention is not limited to any particular type of ink.

The front face of the body may further have decorative grooves disposed therein, such as by etching, machining, lasering, or the like. Thus, in one embodiment, the pattern shown in FIG. 1A may be composed of a black solid printed base, with grooves disposed in a pattern (depicted as a fish scale pattern in FIG. 1A, but not limited to any particular type of pattern, and not limited to a repeating or regular pattern, to a single pattern, or to a pattern having any specific amount of coverage—i.e. the pattern(s) may stretch across the entire card face or may be limited to one or more distinct areas of the card). The grooves may be filled, such as with a different color ink than the face of the card, or the grooves may expose the color of the metal or ceramic or body underlying the ceramic beneath the print layer. The grooves may penetrate only the printed layer, or may penetrate the body. The grooves may be cut into the window and extend across the interface between the edge of the body and the window. Similarly, the printed layer on the card may extend across this interface.

Thus, as depicted in FIG. 1A, the interface 132 between the respective peripheries of the window insert 112 and the hole 108 may be located radially within a printed feature, such as the printed solid black circle 130 surrounding the ship graphic 118, such that the printing that extends over the interface helps to visually de-accentuate the interface. In another embodiment, the interface may be located slightly radially outward of circle 130, such that the design imparted by the grooves also extends across the interface, further de-accentuating the interface. In embodiments in which it is desired for the window to be substantially devoid of printing, the printed content may include only the decorative peripheral outline that overlaps the interface (i.e. is disposed on both the window and the card body on either side of the interface), such that the majority of the window located radially inward of the interface or radially inward of the printed peripheral outline is devoid of printing.

In some embodiments, the front face may further comprise an optional hard coat layer 140, whereas other embodiments may have no covering over the printed/engraved layer or over the uncoated metal or ceramic surface on the front face of the card. The transaction card may further comprise a magnetic stripe 150, a signature panel 152, a hologram 154, a machine readable code 156 (depicted as a bar code, but may include any type of machine readable code, including but not limited to a QR code), or a combination thereof, preferably disposed over the backing layer 120 over the back face 106 of the body 102. Most embodiments also include an embedded integrated circuit (not shown) connected to contacts 160 configured to be read by a card reader, an embedded RFID antenna (not shown), or a combination thereof (for a dual interface (DI) card), to permit use with contact-based and/or contactless card readers. Although hole 108 may be purely aesthetic in nature, the hole may be strategically positioned on the card in a location that enhances RF performance of a dual interface card.

An exemplary process for manufacturing a transaction card as described herein may comprise first providing the body 102 having thickness (T), creating hole 108 in the body having a periphery and extending from the front face 104 to the back face 106 of the body. The non-metal backing layer 120 is positioned adjacent the back face of the body, preferably tacked in place by an adhesive disposed on the side of the backing layer facing the body, and the non-magnifying transparent insert 112 is inserted in the hole 108 in contact with the adhesive of the backing layer 120, and the assembly is then laminated together. The insert may be created by any manner known in the art, such as by cutting or punching a plurality of inserts having the desired periphery from a sheet of the insert materials, or by extruding a rod having the periphery of the insert and cutting chips from the rod having thickness (T).

Hole 108 may be created by any method known in the art, such as in a metal body by cutting (e.g. mechanical or laser), punching, or etching, such as using computer controlled (e.g. computerized numerical control—CNC) machines. In an embodiment in which the body comprises printable stainless steel (or any other coated metal in which the integrity of the coating is important), a resist may be applied over the coated surfaces or portions thereof desired to remain coated during any acid etching steps (such as if an etching step is used for creating the hole). For example, the resist is applied to the entire surface of the metal except where hole 108 and any other pockets or surface patterns are to be formed. After etching, the remaining resist is removed the body is ready for further processing.

In an exemplary ceramic body embodiment in which the body comprises a solid ceramic, the hole is preferably formed in the green state of the ceramic, and then the ceramic is fired. The size of the pre-firing hole diameter is selected to produce the desired post-filing hole diameter given the characteristics of the ceramic material and expected changes in hole diameter, if any, during the firing process. Although alternative process may involve producing a ceramic blank without a hole, and then mechanically milling, lasering, or freeze/fracturing the hole after firing, such methods are generally less efficient and thus not preferred. In an exemplary embodiment in which the body comprises a metal core with a ceramic coating, the metal body may be created as described above, with the desired ceramic coating then applied over the metal. For example, a spray coating of a ceramic combined with a binder may be applied, or a ceramic may be disposed, such as via injection molding, around the metal, and then fired. In preferred embodiments, the sprayed ceramic coating may be applied only to the front face of the metal core. Ceramic-coated bodies with a non-metal core may be similarly processed.

The laminated assembly may than undergo a printing step, to print the desired matter on the front face of the body. In an exemplary process, the printing step comprises printing the printed matter with an inkjet printer using UV curable ink and then exposing the printing to UV radiation suitable to cure the ink. The front face of the body may be etched or engraved with grooves before or after printing. In a process where the grooves are filled, such as with a different color ink or a metal, a groove-filling step may be performed after grooves are created, such as by a wiping step that wipes filler material across the face so that the filler (ink, metal, resin, etc.) only deposits in the indents created by the grooves.

Although described above in a preferred sequence of steps, it should be understood that the above steps are not limited to performance in any particular sequence. For example, in some processes, the steps of cutting the hole, tacking the backing layer in place, and inserting the window may be performed after steps relating to printing, creating grooves, etc. on the front face of the card. In other processes, the grooves may be created before printing.

As depicted in FIG. 2, each finished transaction card 100 defines a first bounded area (corresponding to the length and width of the card, minus the area of any rounded edges). In a metal card embodiment, the card may be manufactured from a sheet 200 having a second area that is somewhat greater than a multiple of the first area (e.g. slightly greater than 8× as depicted in FIG. 2). In such a manufacturing process, the process further comprises cutting the metal sheet into a plurality of transaction cards corresponding to the multiple. As shown in FIG. 2, the ratio of the second area to the first area is typically not an integer (e.g. some value between 8 and 9 as depicted in FIG. 2), whereas the multiple corresponding to the number of cards cut from the sheet may represent the closest integer corresponding to the second area, rounded down. The cutting steps for cutting the hole and for cutting the individual cards from the sheet may be performed by a laser. Any grooves may be machined, etched, or laser formed. Although depicted as nearly finished cards in FIG. 2, it should be understood that in some embodiments, metal or other material cores may be similarly cut from a larger sheet prior to application of the ceramic coating.

The integrated circuit, and connected contacts and/or antenna, may be embedded in the metal card body by any method known in the art, such as is described in U.S. Pat. No. 9,390,366, incorporated herein by reference. In embodiments where the optional hard coat layer is applied to the front face of the card, the hard coat may be applied as a coating, or as a discrete layer, such as is described in U.S. Published Application No. 20140224881, also incorporated herein by reference for its teaching of applying a hard coat layer to a metal card. Although described herein with reference to only certain layers, it should be understood that some embodiments may comprise additional layers between, over, or under the described layers, including laminates, adhesive layers, printed content, or coatings (including but not limited to a ceramic coating), without limitation.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. A transaction card comprising:
   (a) a metal, ceramic, or ceramic-coated body having a thickness, a front face, a back face, and a visual appearance;
   (b) a pocket in the body having a periphery and extending from the back face of the body to a location adjacent the front face of the body;
   (c) a plurality of openings extending from the front face of the body into the pocket, the plurality of openings forming a pattern;
   (d) an insert disposed in the pocket, the insert having a visual appearance different than the visual appearance of the body and visible through the plurality of openings;
   (e) a non-metal backing layer laminated to the back face of the body and a back face of the insert;
   wherein the insert comprises one of:
      (a) a non-magnifying transparent or translucent member having a front-facing surface disposed flush with the front face of the body and having a periphery matching a periphery of the plurality of openings;
      (b) a non-transparent, non-functional member having a front-facing surface disposed recessed relative to the front face of the body;
      (c) a combination of (a) and (b); and
   wherein the non-magnifying transparent or translucent member is adorned with decorative printed content.

2. The transaction card of claim 1, wherein the front face of the body comprises one or more features printed thereon.

3. The transaction card of claim 2, wherein the one or more features printed on the front face of the body and the decorative printed content on the non-magnifying transparent or translucent member comprise UV curable inks or features printed by solvent printing, oxidation printing, dye printing, or sublimation printing.

4. The transaction card of claim 1, comprising a continuous peripheral printed line disposed on a portion of the non-magnifying transparent or translucent member immediately adjacent the body and a portion of the body immediately adjacent the non-magnifying transparent or translucent member, and extending across an interface between the at least one of the plurality of openings and the body.

5. The transaction card of claim 1, further comprising decorative grooves in the front face of the body.

6. The transaction card of claim 5, further comprising a fill in the decorative grooves.

7. The transaction card of claim 6, wherein the fill in the decorative grooves has a first color and the front face of the body has a color different than the first color.

8. The transaction card of claim 1, wherein the front face of the body further comprises a hard coat layer.

9. The transaction card of claim 1, wherein the front face of the body is devoid of a laminated covering.

10. The transaction card of claim 1, further comprising a magnetic stripe, a signature panel, a hologram, a machine-readable code, or a combination thereof.

11. The transaction card of claim 1, further comprising an embedded integrated circuit connected to (a) contacts configured to be read by a card reader, (b) an RFID antenna, or (c) a combination thereof.

12. The transaction card of claim 1, wherein the insert comprises a transparent or translucent member comprising an electronic feature in or on the transparent or translucent member, and having printed conductive traces connected to the electronic feature, further comprising a conductive interface connecting the conductive traces in the transparent or translucent member to conductive members in the body configured to transmit power and/or electrical signals to the conductive traces in the transparent or translucent member.

13. The transaction card of claim 1, wherein the insert comprises a transparent or translucent member having an electronic feature embedded therein comprising a contactless payment module.

14. The transaction card of claim 1, wherein the non-magnifying transparent or translucent member further comprises a coupling antenna disposed in the non-magnifying transparent or translucent member.

15. The transaction card of claim 14, wherein a contactless payment module and the coupling antenna are partially obscured by or integrated with printed decorative content in the non-magnifying transparent or translucent member.

16. The transaction card of claim 1, wherein the body comprises metal and has a contactless payment module disposed therein, and the non-magnifying transparent or translucent member is located in a position on the body that improves RF performance of the card relative to a card with an absence of the non-magnifying transparent or translucent member.

17. The transaction card of claim 1, further comprising a recessed ledge in the back face of the body surrounding a single opening defined by the pocket, wherein the insert comprises a stepped periphery comprising an outermost region having a geometry configured to mate with the recessed ledge, and an innermost periphery configured to fit within the single opening.

18. The transaction card of claim 1, wherein the body comprises at least a first layer having a first thickness that defines the front face of the body and a second layer having a second thickness that defines the back face of the body, the plurality of openings penetrating entirely through the first thickness of the first layer and the single opening penetrating entirely through the second thickness of the second layer.

19. The transaction card of claim 1, further comprising a transparent or translucent layer disposed over the front face of the body and over the plurality of openings.

20. The transaction card of claim 19, wherein the insert comprises a non-transparent member and a plurality of transparent or translucent members, wherein the non-transparent member includes a front-facing surface adjacent to the plurality of openings and wherein the front-facing surface of the non-transparent member is disposed recessed relative to the front face of the body, and the plurality of transparent or translucent members comprise portions of the transparent or translucent layer disposed over the front face of the body that protrude into the plurality of openings.

21. The transaction card of claim 1, wherein the visual appearance of the insert that is different relative to the visual appearance of the body comprises a difference in color, texture, reflectance, opacity, and combinations thereof.

22. The transaction card of claim 1, wherein the insert comprises a material selected from the group consisting of plastic, metal, ceramic, wood, crystal, stone, bone, mother-of-pearl, and leather or combination thereof.

23. The transaction card of claim 1, wherein the body comprises ceramic-coated metal.

24. The transaction card of claim 1, wherein the plurality of openings form one or more alphanumeric characters.

25. The transaction card of claim 24, wherein each of the plurality of openings comprises a slit, the card comprises at least one transparent or translucent layer over the front face of the body or the back face of the body, and the insert comprises a portion of the at least one transparent or translucent layer that extends into the plurality of openings.

26. The transaction card of claim 25, further comprising at least one continuous slit filled with a first filler material in a first portion of the at least one continuous slit and the insert in a second portion of the at least one continuous slit, wherein the first filler material is different than the insert.

27. The transaction card of claim 26, wherein the first filler material is opaque.

28. The transaction card of claim 26, wherein the at least one continuous slit extends from a module pocket to a peripheral edge of the card and the first filler material and the insert are both non-conductive materials.

29. The card of claim 1, wherein the insert comprises a light guide configured to transmit light from an input surface of the light guide located inside the body to the front-facing surface of the non-magnifying transparent or translucent member, the card further comprising at least one light source configured to emit light into the input surface of the light guide.

30. The card of claim 29, further comprising a payment module connected to a controller, wherein the controller is configured to illuminate the at least one light source when the payment module is read by a card reader.

31. The card of claim 30, wherein the card further comprises an embedded power source connected to the at least one light source.

32. The card of claim 30, wherein the payment module is configured to obtain power for powering the at least one light source from the card reader.

33. The card of claim 32, wherein the payment module is configured to obtain power for powering the at least one light source from the card reader via a physical connection between the payment module and the card reader.

34. The card of claim 32, wherein the payment module is configured to obtain power for powering the at least one light source from the card reader via inductive coupling between the payment module and the card reader.

35. The transaction card of claim 29, wherein the at least one light source comprises an LED.

36. A transaction card comprising:
(a) a metal, ceramic, or ceramic-coated body having a thickness, a front face, a back face, and a visual appearance;
(b) a pocket in the body having a periphery and extending from the back face of the body to a location adjacent the front face of the body;
(c) a plurality of openings extending from the front face of the body into the pocket, the plurality of openings forming a pattern;
(d) an insert disposed in the pocket, the insert having a visual appearance different than the visual appearance of the body and visible through the plurality of openings;
(e) a non-metal backing layer laminated to the back face of the body and a back face of the insert;
wherein the insert comprises one of:
(a) a non-magnifying transparent or translucent member having a front-facing surface disposed flush with the front face of the body and having a periphery matching a periphery of the plurality of openings;
(b) a non-transparent, non-functional member having a front-facing surface disposed recessed relative to the front face of the body;
(c) a combination of (a) and (b); and
wherein the non-magnifying transparent or translucent member is devoid of printed content.

37. The transaction card of claim 36, wherein the non-magnifying transparent or translucent member defines an area, and the area defined by the non-magnifying transparent or translucent member is devoid of printed content except for a continuous peripheral printed line disposed on a portion of the non-magnifying transparent or translucent member immediately adjacent the body and a portion of the body immediately adjacent the non-magnifying transparent or translucent member, and extending across an interface between the non-magnifying transparent or translucent member and the body, leaving a majority of the area defined by the non-magnifying transparent or translucent member unobscured by printing.

38. A transaction card comprising:
(a) a metal, ceramic, or ceramic-coated body having a thickness, a front face, a back face, and a visual appearance;
(b) a pocket in the body having a periphery and extending from the back face of the body to a location adjacent the front face of the body;

(c) a plurality of openings extending from the front face of the body into the pocket, the plurality of openings forming a pattern;

(d) an insert disposed in the pocket, the insert having a visual appearance different than the visual appearance of the body and visible through the plurality of openings;

(e) a non-metal backing layer laminated to the back face of the body and a back face of the insert;

wherein the insert comprises a transparent or translucent member having at least a portion thereof that is conductive.

39. The transaction card of claim 38, wherein the transparent or translucent member comprises a conductive coating on an outer surface of the transparent or translucent member or is comprised of a conductive polymer.

40. A transaction card comprising:

(a) a metal, ceramic, or ceramic-coated body having a thickness, a front face, a back face, and a visual appearance;

(b) a pocket in the body having a periphery and extending from the back face of the body to a location adjacent the front face of the body;

(c) a plurality of openings extending from the front face of the body into the pocket, the plurality of openings forming a pattern;

(d) an insert disposed in the pocket, the insert having a visual appearance different than the visual appearance of the body and visible through the plurality of openings;

(e) a non-metal backing layer laminated to the back face of the body and a back face of the insert;

wherein the insert consists of a non-transparent member and wherein the non-transparent member includes a front-facing surface adjacent to the plurality of openings and wherein the front-facing surface of the non-transparent member is disposed recessed relative to the front face of the body, and the plurality of openings are tactilely perceptible in the front face of the body.

41. The transaction card of claim 40, wherein a plurality of portions of the front-facing surface of the non-transparent member protrude into the plurality of openings and are disposed flush with the front face of the body.

42. A transaction card comprising:

(a) a metal, ceramic, or ceramic-coated body having a thickness, a front face, a back face, and a visual appearance;

(b) a pocket in the body having a periphery and extending from the back face of the body to a location adjacent the front face of the body;

(c) a plurality of openings extending from the front face of the body into the pocket, the plurality of openings forming a pattern;

(d) an insert disposed in the pocket, the insert having a visual appearance different than the visual appearance of the body and visible through the plurality of openings;

(e) a non-metal backing layer laminated to the back face of the body and a back face of the insert;

wherein the insert comprises a non-transparent member and a plurality of transparent or translucent members, wherein the non-transparent member includes a front-facing surface adjacent to the plurality of openings and wherein the front-facing surface of the non-transparent member is disposed recessed relative to the front face of the body, and the plurality of transparent or translucent members comprise an epoxy.

43. A process for manufacturing a transaction card, the process comprising:

providing a metal, ceramic, or ceramic-coated body having a thickness, a front face, a back face, and a visual appearance;

creating a pocket in the body having a periphery and extending from the back face of the body to a location adjacent the front face of the body;

creating a plurality of openings extending from the front face of the body into the pocket, the plurality of openings forming a pattern;

positioning an insert in the pocket, the insert having a visual appearance different than the visual appearance of the body and visible through the plurality of openings;

disposing a non-metal backing layer adjacent the back face of the body and a back face of the insert; and laminating the backing layer to the body and the insert;

wherein the insert comprises one of:

(a) a non-magnifying transparent or translucent member having a front-facing surface disposed flush with the front face of the body and having a periphery matching a periphery of at least one of the plurality of openings;

(b) a non-transparent, non-functional member having a front-facing surface disposed recessed relative to the front face of the body;

(c) a combination of (a) and (b); and wherein the non-magnifying transparent or translucent member is adorned with decorative printed content.

44. The process of claim 43, comprising disposing an electronic feature in or on the insert, disposing conductive traces on or in the insert, connecting said conductive traces on or in the insert to the electronic feature, and disposing a conductive interface at an interface between the body and the insert connecting the conductive traces in the insert to conductive members in the body configured to transmit power and/or electrical signals to the conductive traces in the insert.

45. The process of claim 44, wherein disposing the conductive traces on or in the insert comprises printing the conductive traces on a surface of the insert.

46. The process of claim 44, wherein the step of disposing the electronic feature in or on the insert comprises disposing a contactless payment module in or on the insert.

47. The process of claim 46, further comprising disposing a coupling antenna in or on at least one of the plurality of openings for coupling to the contactless payment module.

48. The process of claim 47, wherein the contactless payment module and the coupling antenna are partially obscured by or integrated with printed decorative content in at least one of the plurality of openings.

49. The process of claim 46, wherein the body comprises metal and has the contactless payment module disposed therein, the process further comprising locating the pocket in a position on the body that improves RF performance of the card relative to an otherwise identical card without the pocket.

50. The process of claim 43, wherein the step of providing the body comprises providing a first layer that defines the front face of the body and a second layer that defines the back face of the body, the step of creating the pocket comprising creating a through hole in the second layer, and the step of creating the plurality of openings comprising creating a plurality of through holes in the first layer.

51. The process of claim 43, further comprising creating a recessed ledge in the back face of the body surrounding the pocket, and forming the insert with a stepped periphery comprising an outermost region having a geometry configured to mate with the recessed ledge, and an innermost periphery configured to fit within the pocket.

52. The process of claim 51, wherein the step of positioning the insert in the pocket comprises bonding the outermost region of the insert to the recessed ledge in the body.

53. The process of claim 43, further comprising filling the plurality of openings with a clear epoxy.

54. The process of claim 43, further comprising laminating a clear coating over the front face of the body and at least partially filling the plurality of openings with a portion of the clear coating that flows into the plurality of openings during the step of laminating the clear coating over the front face of the body.

55. The process of claim 43, further comprising at least partially filling the plurality of openings with a portion of the insert that flows into the plurality of openings during a lamination step.

56. The process of claim 43, wherein the body comprises a metal sheet.

57. The process of claim 56, wherein the transaction card has a first area and the metal sheet has an area that is a multiple of the first area, further comprising cutting the metal sheet into a plurality of cards corresponding to the multiple.

58. The process of claim 56, further comprising coating the body with a ceramic coating.

59. The process of claim 58, comprising spray coating only the front face of the body with the ceramic coating.

60. The process of claim 58, comprising injection molding the ceramic coating around the body.

61. The process of claim 43, wherein the body consists of a printable steel metal body.

62. The process of claim 43, wherein step of creating the plurality of openings comprises laser cutting.

63. The process of claim 43, further comprising the step of printing on the front face of the body.

64. The process of claim 63, further comprising disposing an ink-receiving coating on the front face of the body.

65. The process of claim 63, wherein the step of printing on the front face of the body comprises printing with an inkjet printer using UV curable ink and then exposing the printing to UV radiation suitable to cure the ink.

66. The process of claim 43, further comprising creating decorative grooves in the front face of the metal body.

67. The process of claim 66, further comprising filling the decorative grooves.

68. The process of claim 43, further comprising disposing a magnetic stripe, a signature panel, a hologram, a machine-readable code, or a combination thereof, on the transaction card.

69. The process of claim 43, further comprising embedding an integrated circuit in the transaction card.

70. The process of claim 43, further comprising applying a hard coat layer to the front face of the body.

71. The process of claim 43, wherein the step of creating the plurality of openings comprises creating one or more slits and the step of positioning the insert in the pocket comprises laminating at least the backing layer, and optionally a front layer, to the body such that the insert is formed by melted material from the backing layer, the optional front layer, or a combination thereof, flowing into the pocket, the one or more slits, or a combination thereof.

72. The process of claim 71, wherein the step of creating the one or more slits comprises forming each slit into an alphanumeric character.

73. The process of claim 71, wherein the step of creating the one or more slits comprises forming a plurality of slits that together form an alphanumeric character.

74. The process of claim 71, wherein the step of creating the one or more slits comprises creating at least one continuous slit, and filling a portion of the continuous slit with a different material than the insert before laminating at least the backing layer, and optionally the front layer, to the body.

75. The process of claim 74, comprising creating the at least one continuous slit extending from the pocket to a peripheral edge of the transaction card, wherein the different material and the insert are both non-conductive.

76. A transaction card comprising a product of the process of claim 43.

* * * * *